INVENTORS.
LEWIS BALAMUTH, DAVID D.
GRIMES, CAREY A. EVANS,
CLIVE S. AXTELL, CLIFFORD
A. ROBERTSON & CHARLES
BY T. HIGGINS their ATTORNEYS

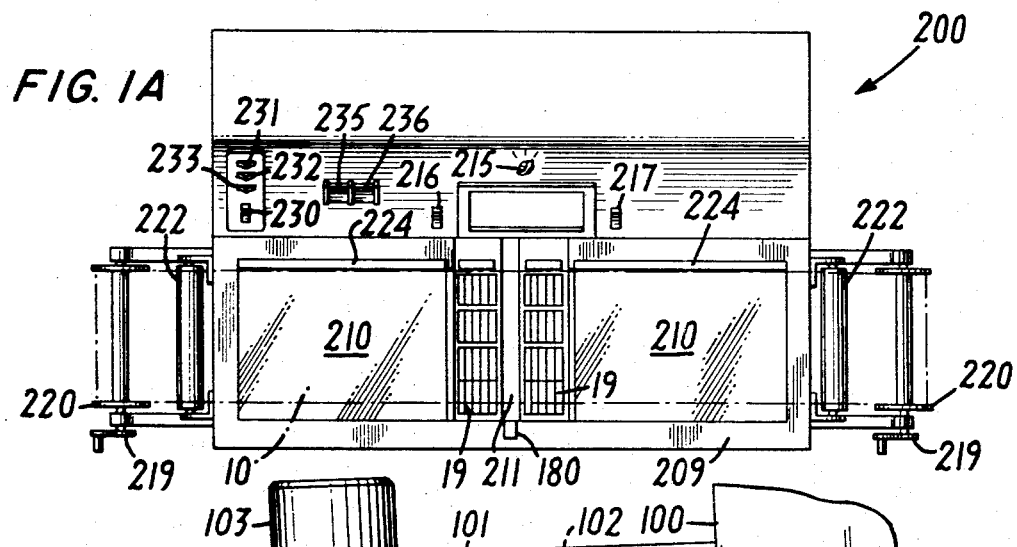
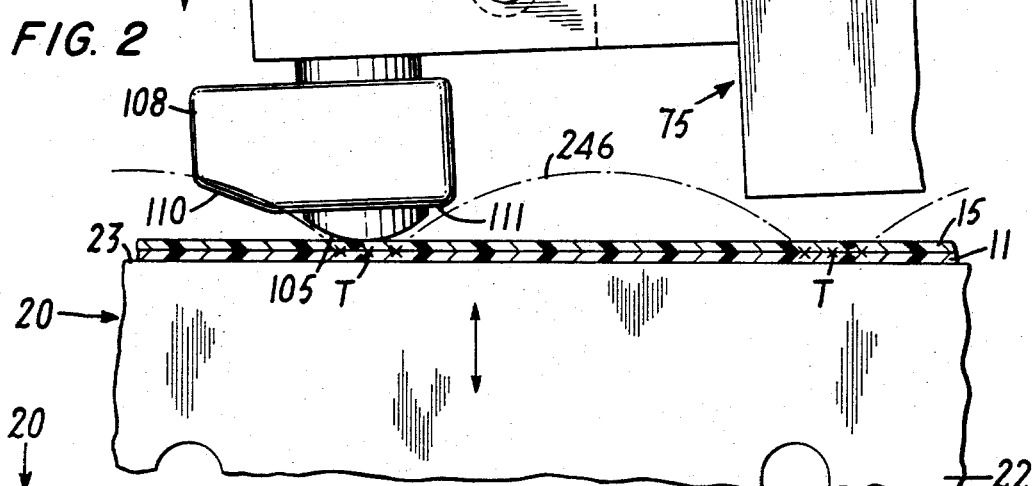
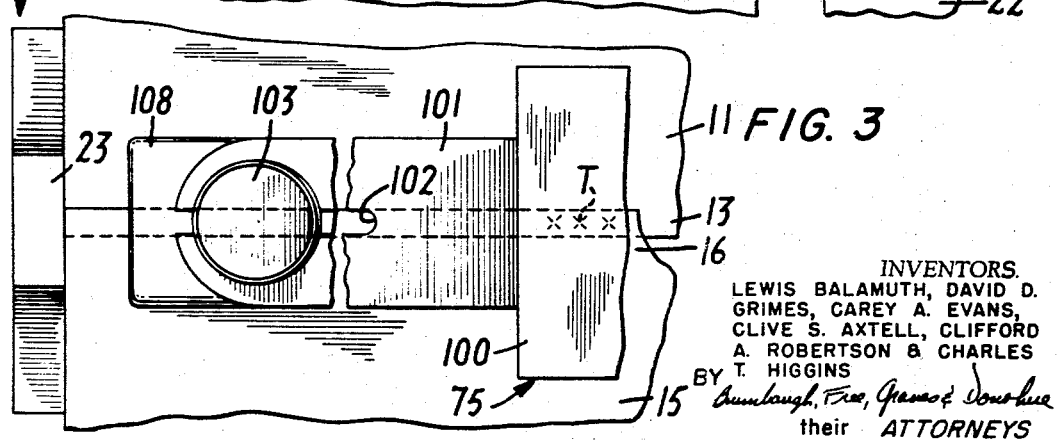

Dec. 24, 1968   L. BALAMUTH ET AL   3,418,185
METHOD AND APPARATUS FOR SPLICING MATERIALS
Filed Aug. 3, 1965   9 Sheets-Sheet 3

INVENTORS.
LEWIS BALAMUTH, DAVID D.
GRIMES, CAREY A. EVANS,
CLIVE S. AXTELL, CLIFFORD
A. ROBERTSON & CHARLES
BY T. HIGGINS their ATTORNEYS

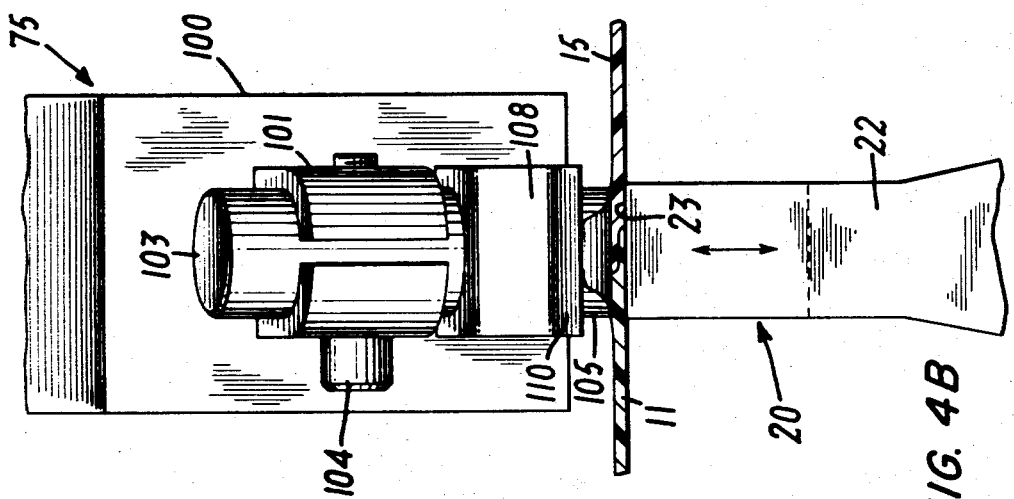
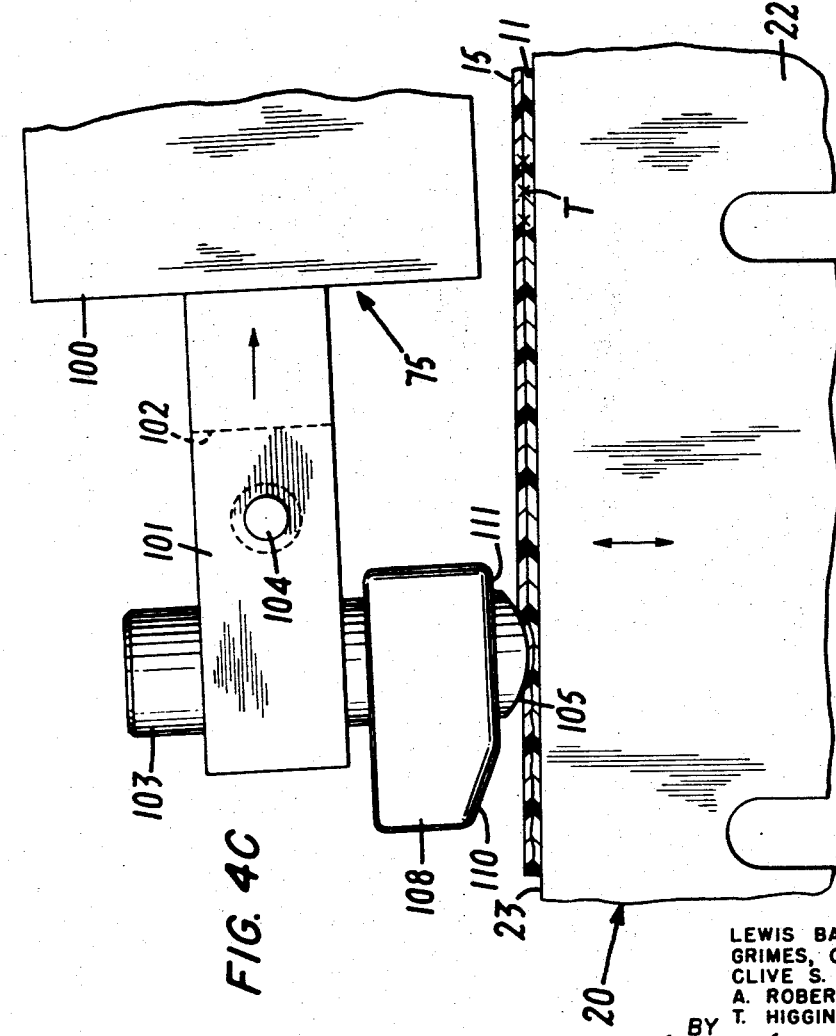

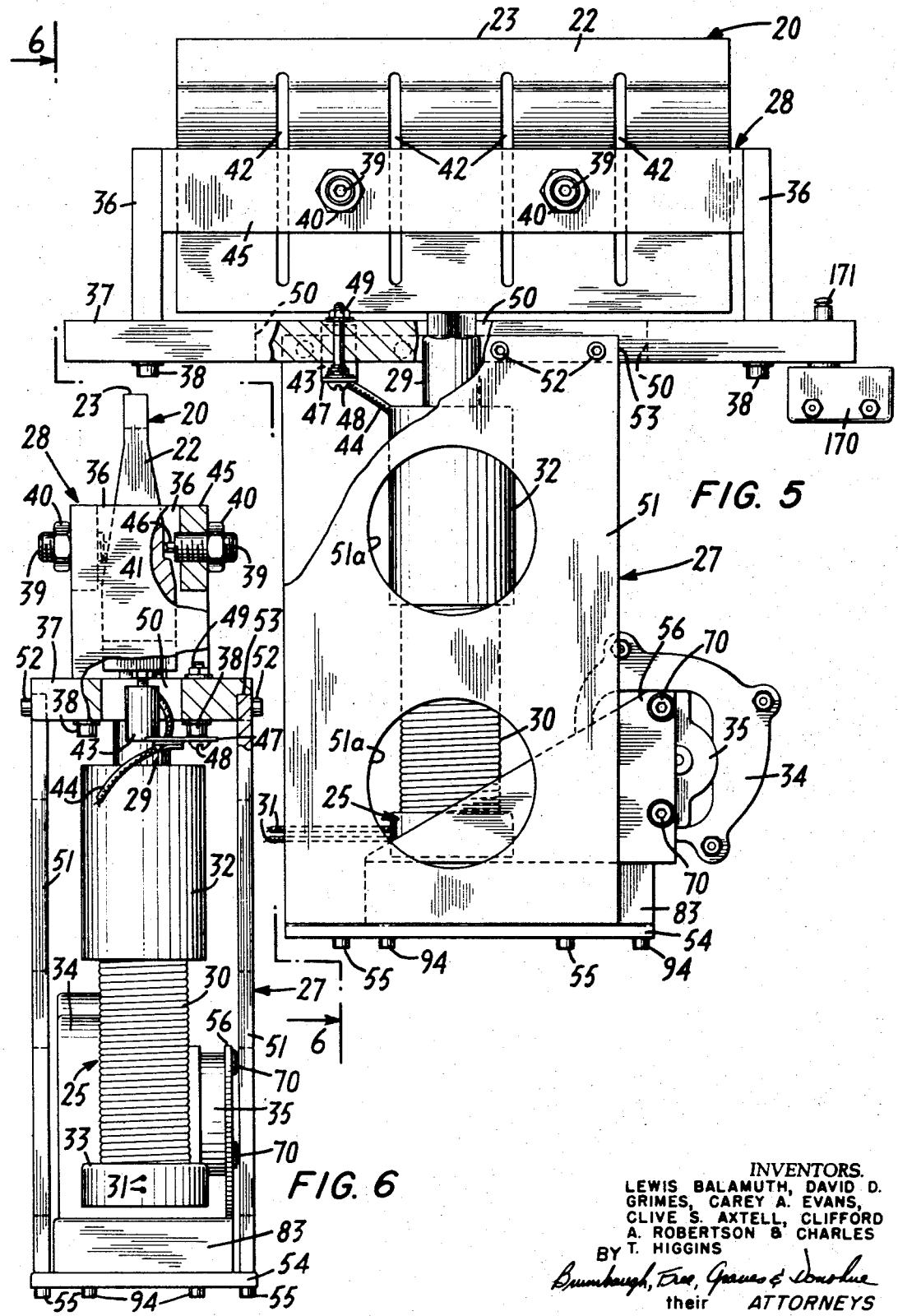

INVENTORS.
LEWIS BALAMUTH, DAVID D.
GRIMES, CAREY A. EVANS,
CLIVE S. AXTELL, CLIFFORD
A. ROBERTSON & CHARLES
T. HIGGINS
BY
their ATTORNEYS Dec. 24, 1968   L. BALAMUTH ETAL   3,418,185
METHOD AND APPARATUS FOR SPLICING MATERIALS
Filed Aug. 3, 1965                                9 Sheets-Sheet 7

INVENTORS.
LEWIS BALAMUTH, DAVID D.
GRIMES, CAREY A. EVANS,
CLIVE S. AXTELL, CLIFFORD
A. ROBERTSON & CHARLES
T. HIGGINS
BY Brumbaugh, Free, Graves & Donohue
their ATTORNEYS Dec. 24, 1968   L. BALAMUTH ETAL   3,418,185
METHOD AND APPARATUS FOR SPLICING MATERIALS
Filed Aug. 3, 1965   9 Sheets-Sheet 8

INVENTORS.
LEWIS BALAMUTH, DAVID D. GRIMES, CAREY A. EVANS, CLIVE S. AXTELL, CLIFFORD A. ROBERTSON & CHARLES T. HIGGINS
BY Brumbaugh, Free, Graves & Donohue
their ATTORNEYS

United States Patent Office 3,418,185
Patented Dec. 24, 1968

3,418,185
METHOD AND APPARATUS FOR
SPLICING MATERIALS
Lewis Balamuth, New York, N.Y., David D. Grimes,
Silver Spring, Md., Carey A. Evans, Huntington, N.Y.,
Clive S. Axtell, Vienna, Va., Clifford A. Robertson,
Bay Shore, N.Y., and Charles T. Higgins, Alexandria,
Va., said Balamuth, said Evans and said Robertson assignors to Cavitron Corporation, a corporation of New
York
Filed Aug. 3, 1965, Ser. No. 476,812
29 Claims. (Cl. 156—73)

This invention relates to the splicing of materials and more particularly to methods and apparatus for permanently joining separate lengths of elongated strip materials with the aid of high frequency vibratory energy. Although of general application, it is especially well suited to the splicing and editing of strips of photographic film or magnetic tape, which are commonly spliced together in various lengths and arrangements in order to obtain a continuous, edited sequence or program. The editing function is also performed when certain segments of the material have become worn or it is desired to delete certain portions thereof.

Heretofore, film joining or splicing systems have generally employed a tape or cement to join the materials after they have been edited. In those systems employing a tape, the two pieces to be joined together are trimmed, and then placed in abutting relationship, after which a piece of splicing tape is affixed over the abutting ends. The tape may be of a pressure or heat sensitive type, or a combination of both, in which case a source of pressure and/or thermal energy is required. This editing and splicing procedure can be extremely time consuming and often results in a splice which is unreliable in strength and erratic in position.

Splicing techniques using a solvent type cement require that substantially all the emulsion be cleaned from the overlapping surfaces prior to the application of the liquid cement and that the splice be held under pressure until set or dry. Certain materials however, such as those having polyester bases, cannot be cemented since the polyesters are impervious to solvents. In addition, it is difficult to attain precision, cleanliness, and reliability in the splices with this technique.

In view of the shortcomings and difficulties exhibited by existing splicing techniques, as amplified by the large number of materials that may be employed in films or tapes, some of which are incapable of being satisfactorily joined by present methods and equipment, a need for a versitile technique and apparatus capable of joining a wide variety of thermoplastic materials has existed.

The present invention has for its primary object the provision of improved joining methods and apparatus which avoid the shortcomings and disadvantages of techniques known heretofore.

An additional object of the invention is to provide improved methods and apparatus for splicing materials incapable of being satisfactorily spliced by presently known methods.

Another object of the present invention is to provide novel material joining methods and apparatus wherein vibratory high frequency energy is employed to obtain the desired seal between the pieces of material.

A further object of this invention is to provide novel material joining methods and apparatus wherein the necessity for cements or adhesive tapes in the splicing process is eliminated.

Yet another object of the invention is to provide an improved technique and apparatus for the joining of sheet materials employing high frequency vibratory energy of particular advantage in the splicing of photographic film and magnetic tape, although not limited thereto.

In seeking solutions to the problems presented by existing splicing systems, it was recognized that high frequency vibratory energy in the ultrasonic range had been successfully applied to the art of joining thermoplastic materials. Apparatus and methods employing sonic or ultrasonic energy for the sealing of sheet-like materials had already been developed by the present assignee, but those techniques were not usable as such in connection with the joining of elongated strips of material having a minimal overlap. Although these earlier developments provided excellent sealing in cases where precise registry of the surfaces was not an important factor and where ample overlap was available, they were not sufficiently reliable where precision alignment with small overlaps was required. However, this earlier work revealed that vibratory energy in the sonic or ultrasonic range would be effective in the splicing of plastic materials, such as used in photographic films and magnetic tapes.

Experimentation with these earlier developments indicated that the applicatio nof vibratory energy to the joining site by the combination of a broad area, blade-like vibratory member and an anvil of similar extent, while an improvement over cementing and taping techniques, still was not satisfactory for precision splicing. For example, in the copending patent application Ser. No. 193,518, filed May 9, 1962, now Patent No. 3,254,402, assigned to the present assignee, to which reference may be had for a complete detailed description thereof, the bonding or joining together of thermoplastic sheet materials is accomplished through the use of a vibratory member having an elongated surface which is vibrated substantially perpendicular to the planes of the two films or sheets being joined, and the overlapped surfaces are positioned between said elongated surface and a stationary anvil. When a positive pressure is applied by compressing the overlapping area between said vibratory member and anvil, the thermoplastic materials are vibrated at the indicated ultrasonic or high frequency and have acoustical energy transmitted thereto, which generates heat internally within the thermoplastic materials so that fusion therebetween results without affecting the strength of the sheet materials adjacent to the joint.

The type of seal obtained with the foregoing apparatus is known as a bar seal and this technique is presently employed for sealing sheet materials along a line up to 6 inches in length at one time. However, as can be appreciated, the longer the length of the seal to be produced in this manner, the more difficult it is to maintain alignment between the output surface of the vibrating blade and the anvil surface. Therefore, in photographic applications, for example, where accurate registry between the segments being joined is a must and the area of overlap is kept to a minimum, it is difficult to produce the necessary uniformity and reliability in the splices with an extended length blade and anvil couple of this type.

Moreover, since in accordance with the foregoing technique, the entire seal is made in a single movement of the blade and anvil, a great deal of driving power is required by the blade to insure that the working surface is vibrating at the proper amplitude (e.g. .0005 to .003 inch) and providing sufficient power along its entire length at one time. This necessitates rather large driving elements for the blade which use large amounts of power and are expensive to build.

A further method of joining thermoplastic sheet materials is disclosed in U.S. Patent No. 3,088,343, assigned to the present assignee. A vibrating, blade-like tool is disposed at a fixed location opposite an anvil wheel and a continuous seam or joint is formed along the overlapped area of the sheets of material. Although this process is highly desirable when welding metals or even certain plastics, it has been found by the inventors that it is difficult to maintain the overlap distance and alignment of the adjoining edges of the strips of material accurately registered, especially when the sheet materials are in the form of thin films liable to tear when subjected to a substantial pulling force.

High frequency joining can also be obtained by maintaining the materials stationary on a non-vibratory anvil and moving a vibratory tool across the overlapped surfaces. In this method of ultrasonic sealing, the vibrating tool tip is in constant contact with the outer surface of the materials being joined during the operation. It has been found that when sealing substantial lengths in this manner, there is a tendency for the vibratory tip to increase in temperature to a degree that affects the frequency and amplitude of vibration, which degrades the quality of the seal produced. It has been found that over an 8 inch distance in which there is a frictional engagement between the tool and the surface of the materials to be joined, sufficient heating of the tip occurs to change the length of the tool.

When continuous seals are made at an average of say, one a minute, the vibratory tool cannot dissipate the heat at a fast enough rate and therefore changes in length to a certain degree after each sealing operation. In view of the fact that film thicknesses of the order of .00075 to .008 inch are involved, this cannot be tolerated. It will be apparent that this situation may not occur until several seals have been completed, but at that time, the heat build-up in the vibratory tool cannot be dissipated at a sufficient rate and poor seals result.

Another disadvantage of the above described ultrasonic sealing equipment, in which a vibratory tool tip is moved across the surface of the material being spliced, is that there is a tendency of the vibratory tip to plow into the plastic film and cause a misalignment of the resulting seal. For example, if the plastic sheets are initially overlapped a distance of .065 inch, the resulting seal may have that dimension at the beginning of the overlap, but due to the plowing action of the vibratory tip, the seal overlap may taper down to .032 inch. Considering that in film splicing work, for example, it is most important that the leading edges of the segment being joined remain parallel, such misalignment of the edges cannot be tolerated. This technique also causes creep or puckering of the sheet materials as the tool is moved across its surface.

In accordance with the present invention, the difficulties presented by existing sealing techniques have been avoided and accurate, reliable seals are possible with minimal areas of overlap. The inventors have found that if the materials to be joined are first tacked, or sealed at spaced points along the area of overlap, they may be subsequently joined continuously without affecting alignment or inducing any stretch or pucker. The tacks may be short so that they themselves do not disturb alignment.

Briefly, in carrying out the method of the present invention, the ends of the strips of material, such as film or magnetic tape, after trimming to the desired lines are positioned in contacting relationship to form an area of overlap having a width generally ranging from .020 to .125 of an inch. The strip materials are firmly maintained in this position and the working face of a high frequency vibratory member is brought into engagement with the materials on one side of their area of overlap to apply high frequency vibratory forces along a line traversing the overlapping area and in a direction generally normal thereto.

With the high frequency vibratory member in engagement with one side of the overlapped sheet materials, a series of impulses of a static force is applied to the other side of said overlap area opposite the line of vibratory force at spaced points therealong to join or tack the sheets. Once the overlapped surfaces have been tacked to prevent misalignment or creep, a static force of sufficient pressure is then applied along the same side of the overlap area as the spaced impulses but in a continuous manner, whereby a continuous seal is formed traversing the entire length of the overlap area.

In its essential aspects, the apparatus of the invention includes a vibratory assembly which employs at least one transducer unit supplied with a biased alternating current to vibrate the transducer at high frequency and relatively small amplitude. A vibrator member having a working face of extended length for contact with the materials in their area of overlap is rigidly secured by a connecting body to the one end of the transducer unit. The static forces are applied to the other side of the area of overlap through a shoe or anvil which is caused to traverse the overlapped area. On the forward stroke of the carriage carrying the anvil, the anvil is intermittently lowered into contact with the overlapping surfaces thereby to effect the tacking of the overlapped materials. On strips 8 inches wide, the tacks may be spaced about an inch apart. At the completion of the forward stroke, the motion is reversed and the carriage with the anvil extending therefrom is moved in the opposite direction across the overlap area. During this motion, the anvil is maintained in continuous contact with the overlapped surfaces to provide a force of sufficient pressure to obtain a joining of said materials along their entire area of overlap.

Although the characteristic features of this invention will be particularly pointed out in the claims, the invention itself, and the manner in which it may be made and used, may be better understood by referring to the following description taken in connection with accompanying drawings forming a part thereof, in which:

FIGURE 1A is a plan view of the splicing apparatus of FIGURE 1 illustrating the working table layout;

FIGURE 2 is a partial schematic view of the splicing apparatus to help illustrate the principles of the present invention;

FIGURE 3 is a partial plan view of the apparatus schematically illustrated in FIGURE 2;

FIGURES 4, 4A, 4B and 4C are partial schematic views of the apparatus useful in explaining the principles of the invention;

FIGURE 5 is a front view of the vibrator and support assemblies mounted in operative relationship to each other, certain parts of the assemblies being shown in section to illustrate structural details;

FIGURE 6 is a side view of the vibrator and support assemblies, with certain parts shown in section, as the same would appear when viewed along line 6—6 of FIGURE 5;

Similar reference characters refer to similar parts throughout the several views of the drawings and the specification.

General description

Figure 1:
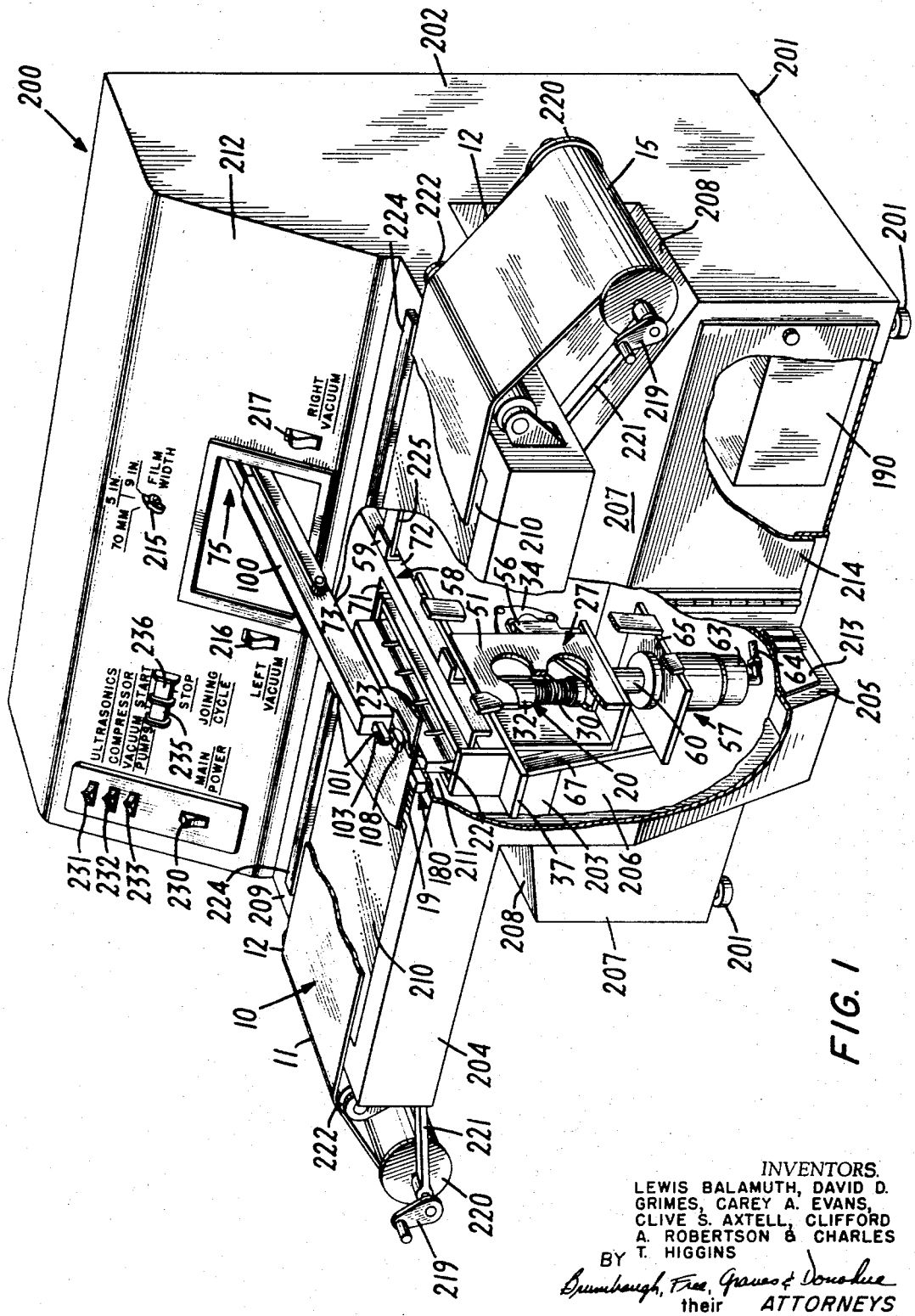
FIGURE 1 is a perspective view of an ultrasonic splicing apparatus constructed in accordance with this invention, certain parts of its cabinet walls being broken away to reveal some of the components contained therein.

The various integrated operating components of the apparatus of this invention are contained within, supported by or mounted on, a cabinet 200 having suitable supports 201 as shown in FIGURE 1. The cabinet 200 is formed of end walls 202, a back wall 203, a front wall 204, and a bottom wall or floor 205. The front wall 204 is essentially in a T-shaped form having side panels 206 and front panels 207 with inclined panels 208 which merge into the end walls 202. As seen best in FIGURE 1A, the cabinet also includes a table top 209 having areas 210 illuminated from below, to view the film 10 which is being processed, and a slot or cutout 211 extending across said table top at approximately the longitudinal mid-section thereof to permit a portion of the vibratory assembly 20 to protrude therefrom. A pair of guide rails 224 are secured to the table top 209 and positioned rearwardly of the illuminated areas to maintain the film 10 is proper alignment during the splicing process. It will be understood that at the time of splicing, the film 10 will actually consist of two separate segments 11, 15 that are to be joined.

The cabinet 200 also includes as a part thereof, a control or instrument panel 212 which rises above the table top 209 at the rear thereof, as shown in FIGURE 1. The instrument panel 212 contains associated instruments and control devices whose control knobs and indicators appear on the front of the panel 212 and within convenient view and reach of the operator. The side panel 206 and front panel 207 are provided with one or more hinged doors 213 and 214, respectively, through which various apparatus components contained within and supported by the bottom wall 205 of the cabinet may be conveniently reached for adjustment or repair.

The apparatus of the invention includes generally, a supporting frame 27 within the cabinet 200 on which a vibratory assembly 20 is mounted. The latter assembly includes a vibratory member 22 whose work face 23 is positioned substantially flush with the table top 209 during the actual joining portion of the splicing cycle, when the segments 11 and 15 of the film srtip are positioned with opposing overlapping surfaces to form an area of overlap. The overlapping area is supported on the work face 23 and the high frequency energy therefrom is applied to one side of the overlapped surfaces. The intermitent and continuous static forces which cooperate with the vibratory force to effect the joinder are applied to the other side of the overlapping area by means of an anvil rod 103 adjustably secured on an extension arm 101 which is in turn fastened to movable arm 100. As will be described in detail hereinafter, the arm 100 is supported by a carriage assembly 75 which moves said anvil rod longitudinally up and back opposite the work face 23 of the vibratory member and simultaneously uges contact surface 105 of the anvil rod into intermittent or continuous engagement with the upper surface of the area of overlap. When not actually being used to perform a splice, the vibratory member is lowered by the drive assembly 57 a few inches below the table top 209 and the arm 100 is retracted within the control panel 212 by the carriage assembly 75.

Figure 13:
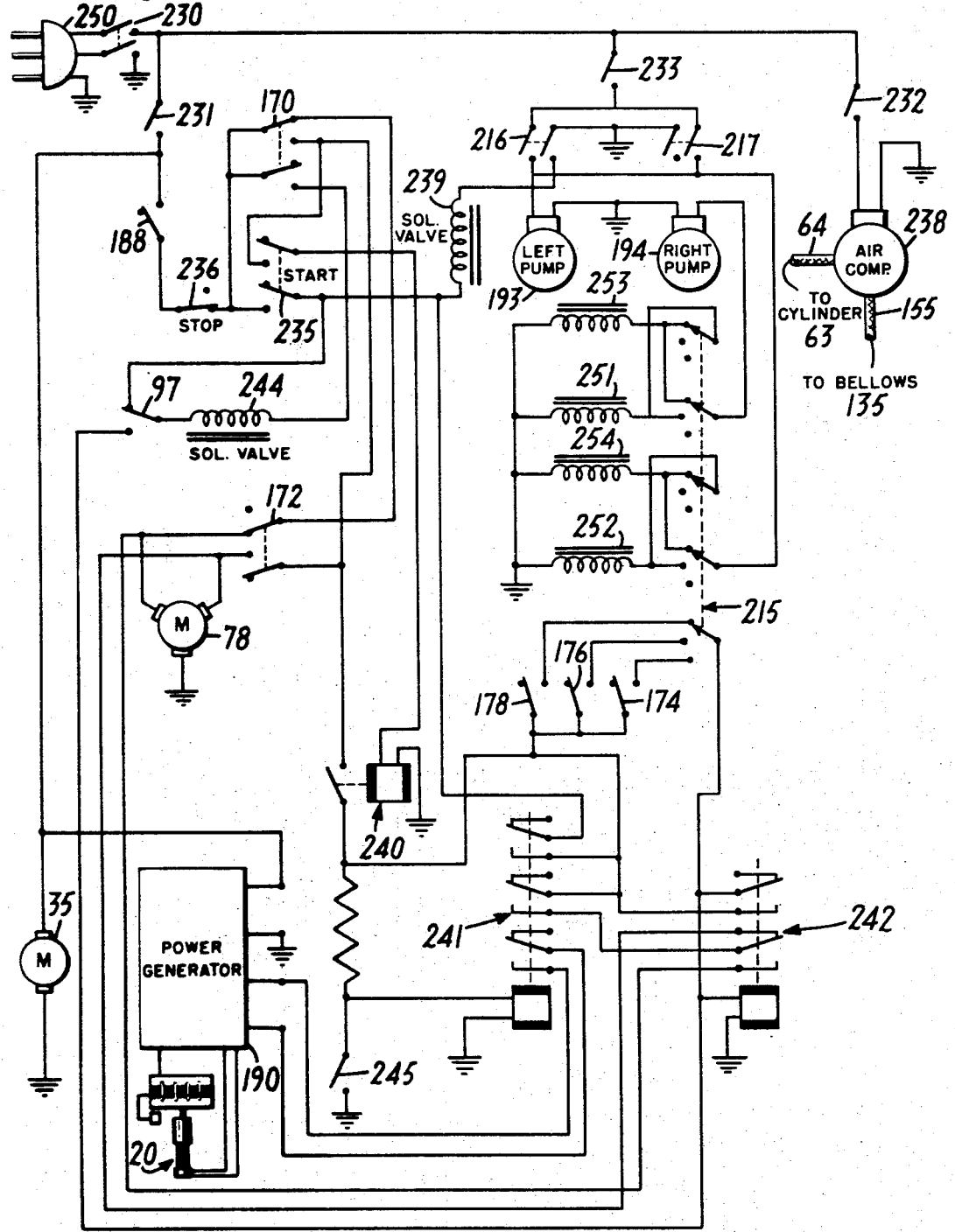
FIGURE 13 is a circuit diagram showing the electrical circuitry of the splicing apparatus of the invention.

The cabinet 200 also includes a suitable power generating system as indicated in FIGURES 1 and 13, which includes a power supply generator 190 for the vibrator assembly. The generator 190 is supported on the floor 205 opposite the door 214 (thus conveniently accessible for replacement and repair) and is connected to the normal 60 cycle, 115 volt voltage supplied by a power cord (not shown). The unit 190 operates to transform the normal line voltage into a biased alternating current of ultrasonic frequency which may be automatically adjusted, tuned and controlled by electromechanical equipment associated with the vibratory assembly 20 and power generator 190.

The apparatus also includes means for initially cutting and trimming the edges of the segments 10 and 15 including a cutter 180 mounted to traverse the length of the slot 211 to produce a clean, straight edge on each of the segments. Since it is necessary to maintain the overlapped segments in fixed relationship to each other during the sealing or joining portion of the splicing operation, holding means in the form of suction plates 19 are mounted substantially flush with the table top 109 and positioned parallel to and on both sides of the slot 211.

The general principles of operation of the invention are explained best by reference to FIGURES 2, 3, 4, 4A, 4B and 4C. After the film segments 11 and 15 have been trimmed, they are held fast to the table 209 by suction plates 19 (see FIGURE 1A) with the overlapping area aligned with the slot 211. The vibrator assembly 20 is then raised such that the work face 23 of the member 22 is flush with the table top thus in contact with the underside of the area of overlap. As indicated by the two-headed arrows in FIGURES 2 and 4, for example, the vibratory member 22 is vibrating at a high frequency, preferably in the rang of 5000 to 100,000 cycles per second with an amplitude of motion at work surface 23 in the order of from .0005 to .003 inch, to apply vibratory forces to the film segments along the overlapping area.

The complete sealing or joining operation requires two passes of the anvil rod 103 across the upper side of the overlapping area. Initially, the arm 100 carrying the anvil rod 103 is retracted within the panel 212. The first pass of the anvil rod occurs as the arm is extended from the panel in the direction of arrow 197 (FIGURE 2). During this movement, the arm 100 is rocked about its pivot point on the carriage 75, whereby the anvil is alternately raised and lowered as it moves out from the panel 212. The path followed by the lower end of the anvil rod is shown by the dot-dash line 246 in FIGURE 2. Each time the anvil rod is lowered, its contact surface 105 applies a static force F of a predetermined magnitude against the upper side of the overlapping area of the segments in a direction F to urge the film firmly against the vibrating work surface 23. The concomitant action of the vibrating and static forces fuses the two segments of film over an area encompassing and somewhat greater than the area over which the pressure is exerted. As the arm 100 moves forward, its intermittent application of the force F to the overlapping area produces a series of seals or tacks T spaced along the length of the overlap.

When the arm 100 has reached the end of its forward stroke, at the front edge of the film segments, its motion is reversed and it begins to retract into the panel 212. At the commencement of the backward stroke, however, the arm is pivoted such that the anvil rod applies the force F against the area of overlap and remains in that position for the duration of the return stroke. Consequently, the static force is constantly applied along a continuous line traversing the area of overlap opposite the vibratory surface 23 as the arm is retracted. At the conclusion of the retracting stroke, the film segments are continuously fused along the entire length of the overlap and thus are firmly and permanently joined to one another.

Figure 4:
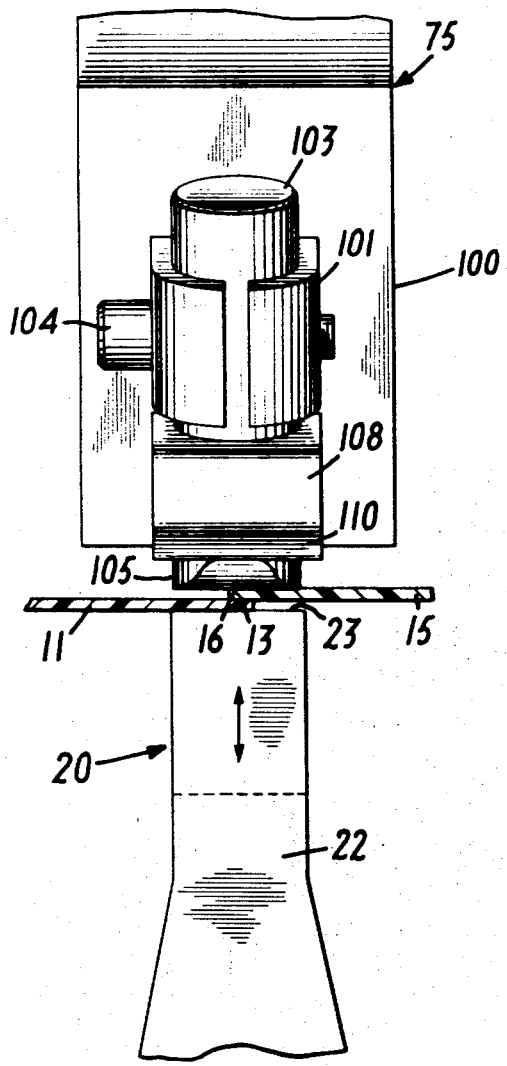
Figure 4A:
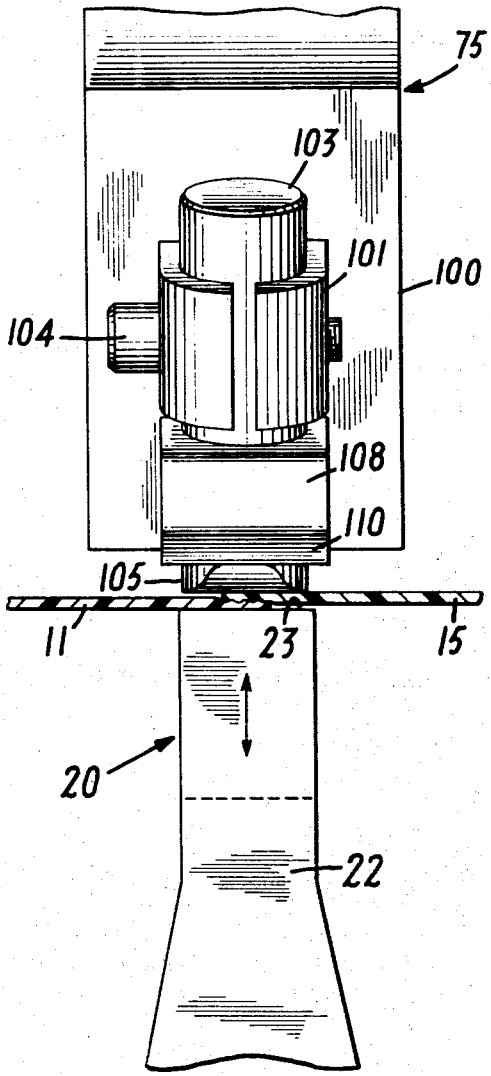

FIGURES 4, 4A, 4B and 4C illustrate in enlarged view an important feature of the invention. As shown therein, the working face 23 of the member 22 and the contact surface 105 of the anvil 103 are both substantially wider than the film overlap. FIGURE 4 shows the relative positions of the elements and the film segments just as the anvil is lowered into contact with the upper surface of the film portion 15. As the force exerted against the film segments increases, the ultrasonic energy causes the plastic to begin to melt or fuse along the interface between the overlapped portions. This is shown in FIGURE 4A. At this time, the pressure exerted against the overlapped area is high, since the force F is applied over a relatively small area.

Finally, as shown in FIGURE 4B, the plastic in the overlapped area is so softened that it is displaced on either side of the initial contact area. The contact surface 105 now bears against a considerably larger film surface, thereby reducing the pressure. This has the effect of automatically terminating the sealing action. The finished joint thickness is somewhat greater than a single film thickness but conisiderably less than the original overlapped thickness.

FIGURE 4C illustrates the action of the anvil during the continuous pressure return stroke. The contact surface 105 initially deforms the film segments slightly in the overlapped area but after the fusion occurs and the pressure relieved, as described above, the surface of the film in the spliced area is restored to a uniform, flat condition. Although in FIGURES 4B and 4C, a discrete line of demarcation is shown between the two film segments in the joint area, no such line is actually present, the plastic fusing into a conglomerate mass.

Preferably, the contact surface 105 of the anvil is in the form of a portion of a cylinder whose axis intersects the axis of the member 103 perpendicular thereto and also perpendicular to the line of travel of the anvil. This can be achieved simply by grinding the end of the anvil rod to the desired contour. Alternatively, a cylindrical roller may be journaled at the lower end of the anvil rod 103 to present a similar cylindrical contact surface.

The cylindrical surface having a length large with respect to the width of the overlap area in conjunction with a vibrator work surface of equal or greater width provides the automatic pressure release effect which avoids burning and brittleness of the film in the joint area. The surface should be long enough relative to the width of the overlap such that it bottoms against single film thicknesses on either side of the overlap and thus will vary depending upon film thickness and width of overlap. For example, in producing a seal between film strips having a thickness of 0.007 inch and an overlap of about 0.062 inch, the contacting surface and the vibrator working face should extend at least approximately 0.050 on either side of the initial overlap area. In a practical embodiment, a vibrator having a working face 0.400 inch wide and a contacting surface on the anvil 0.375 inch in width are able to accommodate a wide range of overlap, including the 0.020 to 0.125 inch generally employed in film splicing.

By means of the foregoing sequence of operations, a pair of film strips or other sheet materials, at least one of which is thermoplastic, may be quickly and accurately joined without the use of heat, chemicals or adhesives required by existing methods and no preparation of the surfaces other than trimming is required. The intermittent tacking step securely holds the segments together so that during the subsequent continuous joining operation, no misalignment or creep of the segments occurs.

The basic structural eleemnts, i.e., the stationary, elongated vibratory element and the movable, minimum contact area anvil, enable the improved splicing operation to be performed reliably, quickly and economically. One quick back and forth motion of the anvil provides both making the actual contact area of the anvil small, the power requirement for the vibratory member is kept small.

The structure and operation of the preferred embodiment will now be described in detail.

*The vibrator and vibrator support assemblies*

The vibrator assembly 20 is shown in FIGURE 1 in its raised position to present the working face 23 of the vibratory member 22 in operative relation to the materials being joined. The vibrator assembly 20 is carried by a support assembly 27 which in turn is mounted on a drive assembly 57. The latter is operative to vertically adjust the position of the support assembly 27, and thus the working face 23, between an upper position shown in FIGURE 1, wherein the working face is substantially flush with the table top 209 of cabinet 200, and a lower position wherein the working face is approximately one and one-half inches below the table top 209.

The vibrator assembly 20, as shown in FIGURES 5 and 6, is supported in a substantially vertical position within ar ectangular frame designated generally as 28, forming a part of support assembly 27. The vibrator assembly 20 itself is comprised of three basic portions, a transducer 25, a connecting body 29, and a vibratory member 22.

The transducer 25 may be any one of a number of available types capable of converting electrical energy into mechanical vibration, such as electro-dynamic, piezoelectric or magnetostrictive. However, for the operating range of frequencies most desirable for joining the materials, 5,000 to 100,000 cycles per second, the transducer is preferably of the magnetostrictive type, comprised preferably of a metal, such as Permanickel, nickel, Permendur, or other metals which have high tensile strength, and are highly magnetostrictive in character. The transducer thus will vibrate to a maximum degree when subjected to the influence of an alternating electromagnetic field established by biased alternating current supplied to a surrounding driving coil or winding from a suitable oscillation generator.

The transducer 25 and connecting body 29 preferably are constructed in the manner disclosed in U.S. Patent No. 3,123,951 granted Mar.10, 1964, assigned to the present assignee, and reference may be had thereto for a complete detailed description of the apparatus. As shown in the patent, the transducer consists essentially of a stack of elongated plates of magnetostrictive material surrounded by a coil excited from a source of alternating current. In accordance with the well known magnetostrictive effect, application of an alternating magnetic field to the plates will result in an elongation and contraction at the frequency of the alternating current provided a steady biasing magnetic flux is simultaneously maintained in the magnetostrictive material. In FIGURES 1, 5 and 6, which show only the external features of the transducer, the coil winding is indicated by the numeral 30 and alternating current at suitable frequency from the power generator 190 is applied thereto via conductors 31. The magnetostrictive stack is disposed vertically within the coil 30 which is wound around a hollow, non-magnetic, e.g. plastic, sleeve having larger diameter end portions 32, 33. To render the vibratory output of the magnetostrictive stack available for use, a generally cylindrical connecting body 29, preferably solid and of a metal such as Monel, is rigidly fastened at one end to the stack.

As described in the above-mentioned Patent No. 3,123,951, maximum transference of vibratory energy is obtained by making the connecting body of a length equal to an integral number of half wavelengths in the material at the applied frequency. The connecting body is rigidly mounted in the end portion 32 at a point corresponding to a node of longitudinal vibration therein.

The transducer 25 may be water or air cooled depending on the application and the duty cycle of the unit. In the illustrated embodiment, a blower 34 operated by a suitable motor 35, is mounted at the lower end of the transducer 25, and provides a stream of air over the magnetostrictive stack to dissipate the heat generated therein during operation. Suitable ports (not shown) may be provided in the end portion 32 to permit circulation of the air for adequate cooling effects.

The motor 35 is secured to a vertically positioned blower mounting plate 56 by screws 70 and the blower mounting plate is rigidly fastened to a chamber or manifold 83 of the support assembly 27. The blower 34 may be energized either in synchronism with the operation of the transducer 25, or continuously.

The vibratory member 22 preferably is in the form of an acoustic impedance transformer made of a strong, acoustically sound metal, such as steel. Monel metal, titanium, Phosphor-bronze, brass or beryllium copper, so dimensioned that a loop of longitudinal motion occurs at the free end surface 23, when compressional wave energy is supplied to its lower, or input surface. By tapering the member 22 between its input and output ends as shown, a mass differential is established which is effective to amplify or increase the amplitude of the input vibrations applied to it from the connecting body firmly threaded to it. In-phase longitudinal motion of the work surface 23 in the order of .0005 to .003 inch is obtained when the transducer 25 is actuated.

The vibratory member 22 illustrated in FIGURES 5 and 6 is shown to be effectively divided into four portions separated from each other by slots 42 which extend completely through the thickness of the member but stop short of the input and output surfaces. These slots effectively isolate each section of the vibratory member 22 from one another to minimize interaction therebetween and thus permit more uniform vibration of the working face 23. A vibratory tool of this type is described in greater detail in U.S. Patent No. 3,113,225 for Ultrasonic Vibrated Members, assigned to the present assignee. A vibratory member according to this construction may be made to any desired length enabling application of the techniques of the present invention to the joinder of surfaces having any desired width. For the purposes of the present invention, a single transducer 25 supplies sufficient energy to drive the member 22, although additional transducers may be added if required.

For monitoring purposes, a vibration responsive device 43 may be associated with the vibratory member 22 for generating an electrical signal proportional to the amplitude of vibration. One form of such device includes a pin fixed to the input surface of the member 22 and a magenetic coil supported from the non-vibrating frame in inductive relation to the pin. The coil then produces an output signal proportional to the amplitude of vibration. The signal is then transmitted via the cable 44 to the power generator 190 to automatically vary the power output of the generator to maintain the amplitude of vibration of the vibratory member 22 at a substantially constant value. As shown, the vibration responsive device 43 may be mounted on the base plate 37 by an integral support arm 47 secured to the base plate by a bolt 48 with associated nut 49. The slot 50 provided in the plate 37 permits the vibration responsive device 43 and connecting body 29 to extend through the base plate 37 to the vibratory member 22.

The support structure 27 is designed to rigidly support the vibrator assembly 20 without damping out the high frequency vibrations imparted to the vibratory member 22 by the transducer 25. A rectangular frame 28 consisting of a pair of end plates 36 mounted vertically in parallel spaced relationship on a base plate 37 as by bolts 38, and a pair of horizontally extending side bars 45 are secured by welding or other convenient means to the end plates 36. To support a vibratory member 22, each of the side bars 45 is provided with a plurality of threaded studs 39 spaced along its length. The studs 39 are threadably engaged in the side bars 45 and provided with locking nuts 40 in well known fashion. The vibratory member 22 is provided with indents 41 (FIGURE 6) on either side thereof and located at or adjacent to the nodal vibration point thereof. These indents 41 are located to receive the ends 46 of the studs 39 and as will be appreciated, when the studs are tightened and locked, the vibratory member will be supported in a rigid manner in the frame 28 without substantially affecting its longitudinal vibration.

A pair of side support plates 51 are secured at one end thereof in respective recesses 53 along the opposite sides of the base plate 37 (as by bolts 52) and are joined at their other end to a bottom plate 54 as by bolts 55. The side support plates 51 are provided with apertures 51a for weight reduction and ventilation of the transducer 25.

It will be seen that the vibrator assembly 20, including the transducer 25, connecting body 29 and vibratory member 22, is coupled to the support structure 27 only by the studs 39, which are located at a nodal point of longitudinal vibration of the member 22.

The base plate 37 also carries a limit switch 170 having a push-button 171 extending through to its upper side. As will be described in greater detail hereinafter, the switch 170 is actuated when the vibrator assembly is raised to its operative position during the splicing cycle.

*The drive assembly*

Figure 8:
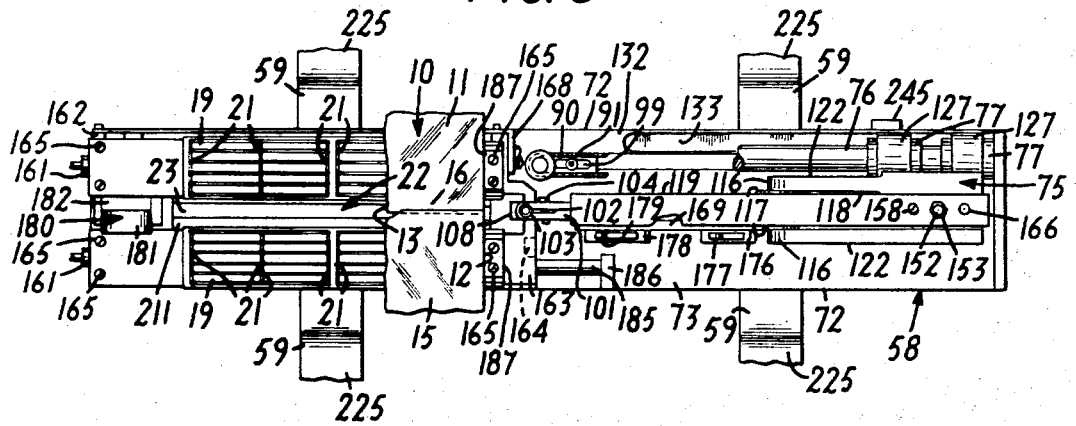
FIGURE 8 is a top view of the mounted assemblies as the same would appear when viewed along line 8—8 of FIGURE 7.
Figure 7:
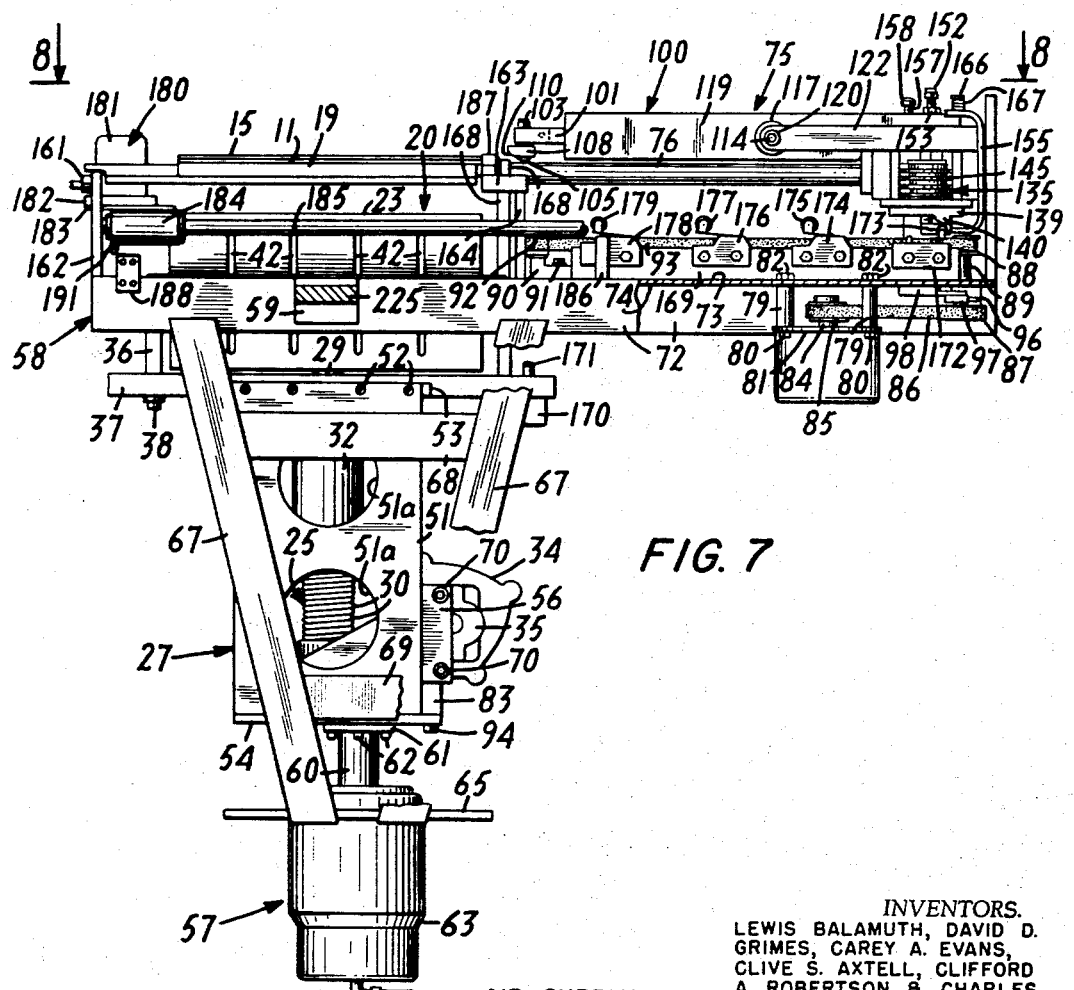
FIGURE 7 is a front view, partly broken away and in section which shows the vibrator, support, drive and carriage assemblies mounted in working operative relationship to each other.

The support structure 27 is mounted on the drive assembly 57 for vertical movement within the cabinet 200, thereby to raise and lower the work surface 23 of the vibratory member 20. In FIGURES 7 and 8, all of the assemblies are shown combined in operative relationship to each other as they appear inside of the cabinet 200.

The drive assembly 57 is suspended from a support member 58 whose cross section is in the form of a U-shaped channel presenting side flanges 72 joined by a connecting web 73 having a cutout 71 (see FIGURE 1). The channel 58 is the main support member for all of the assemblies, the interrelationship of which is to be hereinafter discussed in detail, and is itself supported within the cabinet 200 in a horizontal position by four L-shaped angle brackets 59 which are welded or rigidly joined to the channel side flanges 72 and are in turn supported on frame members 225 (FIGURE 1) which are part of the cabinet structure 200.

The entire support assembly 27 is supported on a piston rod 60 that is rigidly secured at one end to a flanged plate 61 which in turn is fastened by bolts 62 to the bottom plate 54 of the support assembly 27. The other end of the piston rod 60 is connected to a piston movable vertically within a cylinder 63. A source of compressed air (not shown) housed in the cabinet 200, is coupled through a supply conduit 64 to the cylinder 63 by an elbow fitting 66. The cylinder 63 is fixed to a plate 65 which in turn is suspended from the side flanges 72 of the channel 58 by four support bars 67. Pairs of rigid horizontal upper crossbars 68 and lower crossbars 69 brace the support base 67 to strengthen the complete structure. In the position shown in FIGURE 7, the working face 23 of the vibratory member 22 is lowered below the level of the work table, as it would be prior to commencing the joining operation.

When air is supplied to the cylinder 63 the piston rod 60 moves upward to raise the entire support assembly 27 until the working face 23 of the vibratory member 22 is substantially flush and parallel with the table top 209. At this point, the push-button 171 contacts the member 58 to actuate the switch 170 carried by the base plate 37. After the splicing operation is completed, the air pressure in the cylinder is released and the structure is lowered to the position shown.

*The carriage assembly*

Figure 9:
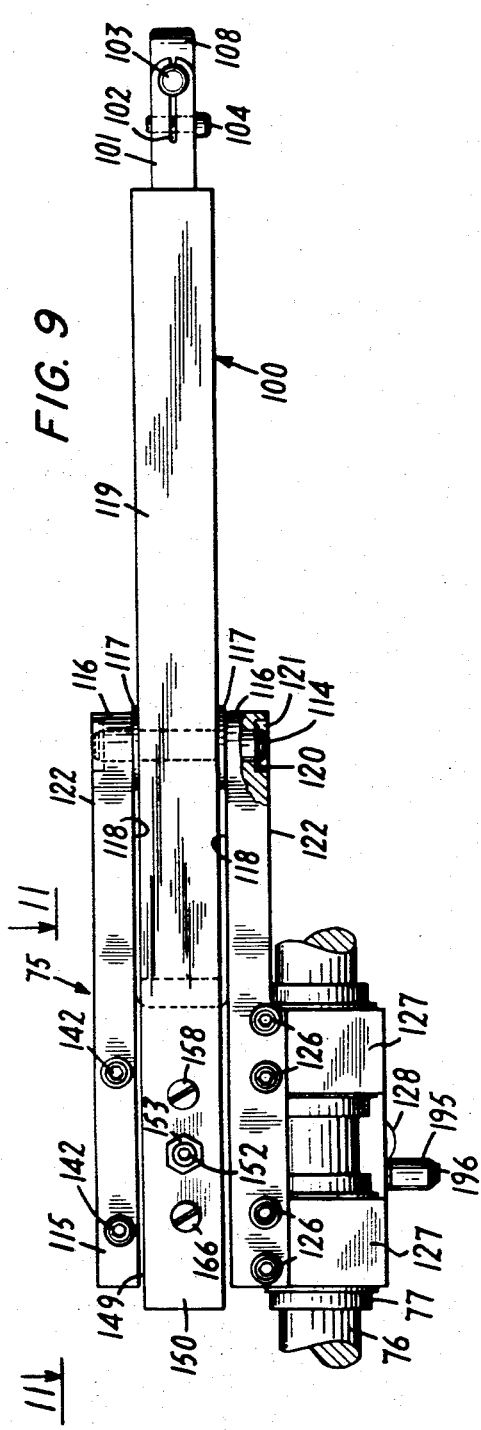
FIGURE 9 is a top view of the carriage assembly, certain parts thereof being shown in section to illustrate structural details.
Figure 10:
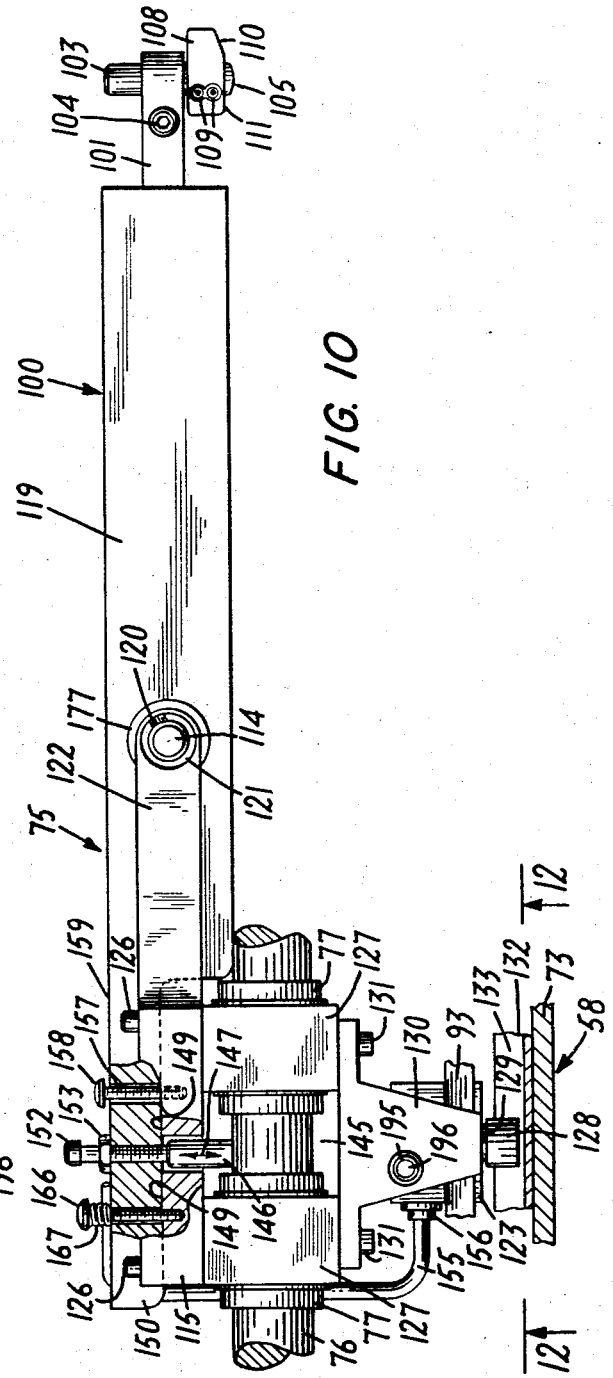
FIGURE 10 is a side view of the carriage assembly shown in FIGURE 9, certain parts thereof being shown in section.

The carriage assembly 75 illustrated in FIGURES 7 through 12 is mounted to be traversed along a given path for a specific selectable distance depending on the width of the strip materials to be spliced. FIGURES 9 and 10 show the structure including the arm 100 viewed from the opposite direction of that shown in FIGURES 7 and 8 to better illustrate the carriage construction. Since a nine inch wide strip has been selected for illustrative purposes, the travel of the carriage will be approximately that distance on each of its forward and return strokes. The tacking or pre-sealing of the materials is accomplished on the forward stroke by applying a series of intermittent static forces against the materials along a path traversing the area of overlap, the forces being of sufficient pressure to tack join the materials together. On the return stroke of the carriage assembly a substantially constant static force is applied along a continuous path traversing the overlapped areas in a direction towards the work face 23 of the vibratory member, thereby to obtain a joining of the materials along their entire overlapping surfaces.

The carriage assembly 75 is mounted for controlled horizontal movement from a bearing rail 76 (FIGURES 7, 8) by a pair of bushings 77. The carriage assembly 75 is driven along the rail 76 by an endless belt 93 secured to the carriage and looped about a pair of pulleys 88, 92. The pulley 88 is keyed on a common shaft 89 with a pulley 87 which is driven by belt 86. A reversible electric motor 78 rotates the pulley 85 keyed to its shaft 84 to drive the belt 86. The motor is supported from the web 73 of the support member 58 by means of spacers 79, bolts 80 and nuts 82. The electrical control of the motor 78 will be described in connection with FIGURE 13.

The pulley 92 is journalled on an idler mount 90 secured to the web 73 of support 58 by bolt 91. A slot 99 (FIGURE 8) is provided in the idler mount 90 to permit horizantal adjustment of the mount to obtain the desired tension in the belt 93. From the above arrangement it will be seen that when the motor 78 is energized, the rotary motion of its shaft 84 will be transmitted through belt 86 to drive belt 93 which in turn moves the carriage clamped thereto along the bearing rail.

Mounted on the shaft 89 below web 73 is a cam 96 suitably shaped to actuate a microswitch 97 in a preselected sequence. The microswitch 97 controls the source of power to the carriage assembly 75 for regulating the up-and-down oscillating movement of the carriage arm 100 during its horizontal movement. The microswitch 97 may be mounted to the lower surface 74 of web 73 as by a spacer 98 which maintains it in a fixed position for engagement with the cam 96. The number of times the microswitch 97 is actuated per revolution of the cam 96 will depend upon the type of materials being joined, their width, the speed of travel of the carriage, etc.

The arm 100 is provided with an arm extension 101 protruding from its forward end and having a shoe or anvil rod 103 which is vertically mounted within an opening in the arm extension. A slot 102 associated with the opening to receive the shoe 103 is provided and an adjustment screw 104, when tightened, will retain the anvil rod 103 in any desired vertical position.

The adjustment in vertical height so available is desirable to regulate the force with which the contacting face 105 of the anvil rod 103 engages the overlapped materials 11 and 15. The anvil rod 103 is preferably of a high density material such as tungsten carbide and has a cylindrically contoured contacting face 105 to present a minimal contacting area to the strips of material 11 and 15, as described in connection with FIGURES 4, 4A, 4B and 4C. The force, which preferably is adjusted to be suitable for a range of material thicknesses and composition, is applied against the overlapped surfaces in a direction towards the working face 23 of the vibratory member 22 to obtain the desired joining of the materials. It will be noted that the anvil rod 103 is not rotatably mounted and need not be so even though on its return stroke it is in continuous contact with the strip materials. This is because the high frequency longitudinal vibrations engendered at the working surface 23 of vibratory member 22 aid in substantially reducing the coefficient of friction between the contacting surface 105 and the strip materials.

As seen best in FIGURES 9 and 10, a pressure member or guide 108 is mounted on the shoe 103 to be vertically adjusted by set screws 109 and has on its underside upwardly sloping surfaces 110 and 111 for contact with the flattening out of any irregularities in the overlapped area of the materials prior to their being joined. The surface 110 essentially skims along the strips 10 and 15 prior to their engagement with the contacting surface 105 of shoe 103, during the skip tacking of the film strips 11 and 15. On the reverse stroke of the carriage assembly 75, the contacting face 105 of the anvil rod 103 is brought into continuous engagement with the overlapping strips and the surface 111 of the anvil shoe 108 will perform any necessary smoothing out.

The arm 100 itself is pivotally mounted on a shaft 114 which is supported between a pair of parallel arms 116 integral with and extending from mounting block 115 on the carriage 75. A pair of spacers 117 are interposed between the inner walls 118 of the arms 116 and the side walls 119 of arm 100 and the shaft 114 is maintained in position by a pair of snap rings 120 secured in grooves (not shown) at each end of the shaft 114. The ends of the shaft 114 and the snap rings are recessed within counterbores 121 in the outer wall 122 of the arms 116. As can be seen, the arm 100 is free to pivot about the shaft 114 when a force is applied to its rear portion 150.

The rearward end of the mounting block 115 is secured by bolts 126 to the bushing blocks 127, each of which carries a bushing 77. The bushings 77 are in axial alignment with each other and of a suitable internal diameter to slide freely but without play along the bearing rail 76. The entire carriage assembly 75 is thus constrained to move along the bearing rail.

To prevent the carriage assembly 75 from twisting about the bearing rail 76 and thus maintain it in proper horizontal alignment at all times a roller 128 is rotatably mounted on shaft 129 which extends from a skirt 130, the latter being secured by bolts 131 to the underside of the bushing blocks 127. The roller 128 rides in an elongated channel 133 (FIGURES 8, 10) in the carriage guide member 132 which is rigidly secured to the web 73 of the channel support member 58. Thus, the carriage assembly 75 is firmly and accurately positioned over its entire length of movement along the bearing rail 76.

Figure 11:
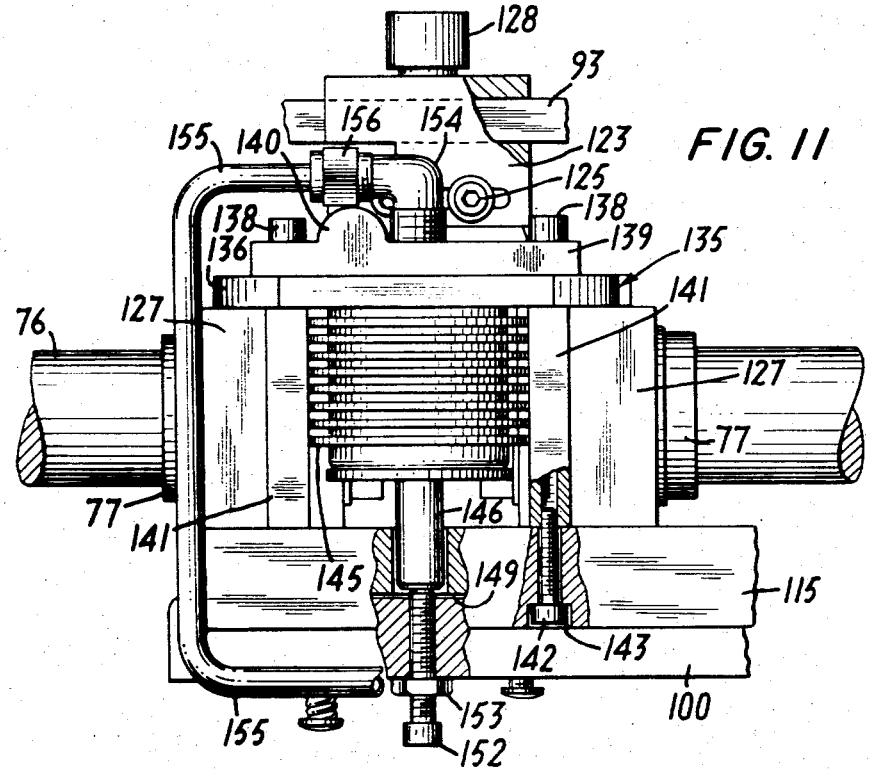
FIGURE 11 is a partial side view of the carriage assembly as the same would appear when viewed in the direction of the arrows along line 11—11 of FIGURE 9, certain parts thereof being shown in section.
Figure 12:
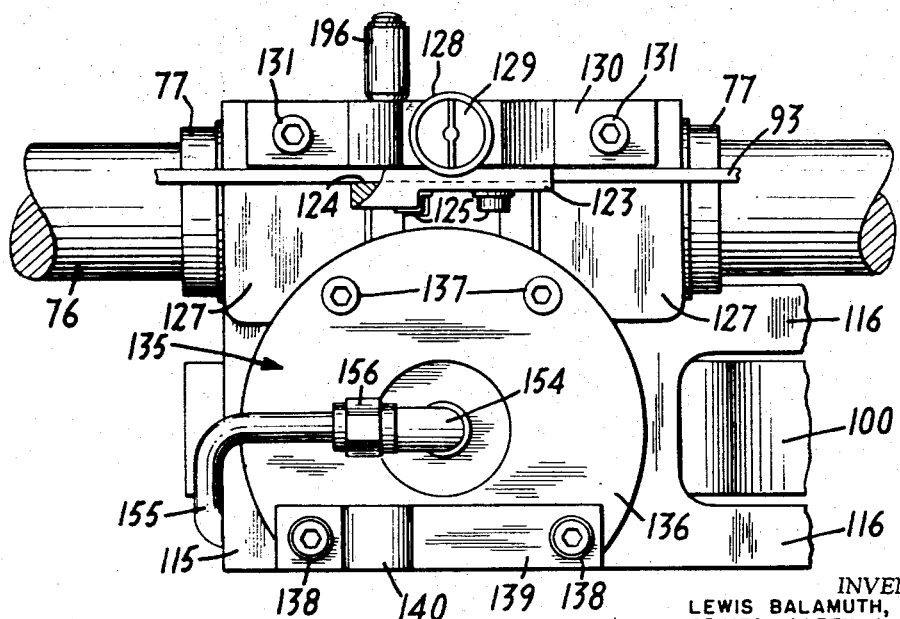
FIGURE 12 is a partial side view of the carriage assembly as the same would appear when viewed in the direction of the arrows along line 12—12 of FIGURE 10, certain parts thereof being shown in section.

The belt 93 is firmly fastened to the carriage assembly 75 by means of a clamping member 123 which is held by bolts 125 against the inner surface of the skirt 130 (FIGURES 10, 11, 12). With the belt in position between the clamping member 123 and the skirt 130 and the bolts 125 tightened, operation of the motor 78 (FIGURE 7) will cause the carriage assembly 75 to be moved along the bearing rail 76.

The oscillating or pivotal movement of the arm 100 about the shaft 114 is obtained by means of a bellows 135 on the carriage assembly. The bellows 135 is supported by a base plate 136 (FIGURES 11 and 12) which is secured by bolts 137 passing therethrough to the underside of the bushing blocks 127 and a second pair of bolts 138 extending through cam 139, base plate 136 and into a pair of internally threaded spacers 141 (FIGURE 11). The other end of spacers 141 are secured to the mounting block 115 by bolts 142 positioned in counterbored clearance holes 143.

The bellows diaphragm 145 (FIGURE 11) is sealed at one end in an air-tight manner to the base plate 136 and has a drive pin 146 extending axially therefrom at its opposite end. The pin 146 will move from its lower position shown with the bellows compressed to an upper position when air is supplied to the bellows. A slot 149 in the mounting block 115 accommodates the rear portion 150 of arm 100 which carries an adjustment screw 152 with a lock nut 153 and a stop screw 157. The screw 152 is threaded in the portion 150 of the arm and bottoms on the top of the pin 146. In this manner, the exact amount of rotation of the arm 100 about the shaft 114 and the force to be applied by the anvil shoe 103 can be easily controlled without adjusting the air supply for the bellows 135.

The air for the bellows 135 enters through the base plate 136 (FIGURE 12) via an elbow fitting 154. A supply conduit 155 is coupled to the elbow 154 by a nut 156. The supply of compressed air is connected to the remote end of the conduit 155 through a flexible hose (not shown) which is sufficiently long to allow for the movement of the carriage assembly during operation.

The exact amount of oscillation or pivoting of the arm 100 may be manually controlled by the stop screw 157 which extends through a hole provided in the rear portion 150 of the arm 100 and threadably engages the mounting block 115. By adjusting the screw, its head 158 provides a limit stop to establish the maximum swing of the arm 100 about the shaft 114.

Spring means to quickly return the arm 100 to its normal horizontal position after each oscillation is provided by a screw 166 extending through a clearance hole in the rear portion 150 of the arm 100 and threadably engaging the mounting block 115. A compression spring 167 is coiled about the screw beneath its head and by properly adjusting the screw 166, the spring will apply the necessary compression force to return the arm to its normal horizontal position when air pressure to the bellows is released.

Operation of the various components described above occurs in a sequence to be described hereinafter, as controlled by a plurality of switches associated with the carriage mechanism. Referring to FIGURES 7 and 11, the cam plate 139 on the carriage assembly includes a cam surface 140 which serves to actuate a series of microswitches 172, 174, 176 and 178 having respective contact rollers 173, 175, 177 and 179, mounted on a bar 169. The skirt 130 (FIGURE 10) also carries a roller 195 which serves to actuate a microswitch 245 mounted on the side flange 72 of the channel support 58 (see FIGURE 8) as the carriage assembly leaves and returns to its retracted or storage position.

Finally, a microswitch 188 mounted at the front end of the channel support member 58 on its flange 72 is arranged to be actuated when the cutter 180 is in its home position. As seen in FIGURES 7 and 8, the cutter is supported by a base plate 182 carried by a bushing 184 adapted to slide on a shaft 185 along the length of the slot 211 in the work table. The shaft 185 is supported between a pair of bracket members 162, 186 on the support member 58. With the cutter in its home position forward of the edges of the strips to be joined, the bushing 184 contacts the switch roller 191, actuating the switch 188.

*Electrical circuit*

FIGURE 13 is a schematic diagram of the electrical circuit of the invention and also illustrates the air compressor and pumps, with their associated solenoid valves, for actuating the drive assembly 57 and the suction plates 19. It will be understood, of course, that the air compressor 238 and the vacuum pumps 193, 194 are housed within the cabinet 200. These units may be of any suitable type driven by their own electric motors.

A plug 250 couples standard 60 cycle alternating current power from any convenient outlet to the apparatus through the main power switch 230. Manually actuated switches serve to supply power to the ultrasonic apparatus, the vacuum pumps, and the air compressor, respectively. The circuit will be described in its entirety in connection with the description of the overall operation to follow, it being understood that all of the switches are shown open and the relays unenergized in FIGURE 13.

*Operation*

To commence the splicing operation, the switch 230 designated "MAIN POWER" is manually thrown by the operator, along with the circuit breaker switches 231, 232, 233, designated "ULTRASONICS," "COMPRESSOR" and "VACUUM PUMPS" respectively, all of which are located on the instrument panel 212 of the cabinet 200. The compressor switch 232 supplies power to an air compressor 238 contained within the cabinet 200 (FIGURE 13) which in turn supplies compressed air via conduit 64 and solenoid valve 239 to the cylinder 63 of the drive assembly 57 to control the position of the vibrator assembly 20.

The switch 215 is then adjusted to the position corresponding to the width of the strips to be sealed. As indicated on the instrument panel 212, the splicing equipment is designed to accommodate several standard size film widths, such as 70 mm., 5 inches and 9 inches. For purposes of illustration, the 9-inch film width has been selected for the sealing operation and the switch 215 is rotated to the corresponding position. As will be seen, the position of the switch 215 determines both the area of actuation of the suction plates 19 and the length of stroke of the carriage assembly 57.

The splicing of photographic film often accompanies the editing or deletion of unwanted parts of the film strip. The table top 209 includes a pair of illuminated areas 210 which allow the contents of the film strip to be viewed by the operator as it is moved across the table top by manual rotation of the handles 219 on the film spools 220, the latter being supported on brackets 221 secured to the table. A pair of idler rollers 222 are rotatably mounted on the end walls 202 to guide the film across the table top 209 with a minimum of wear on the film. The areas 210 may be illuminated by any convenient light source such as cold cathode tubing, connected through appropriate switches to the power source (not shown).

The edge 12 of the film 10 is maintained firmly against the guide rails 224 during the splicing operation. The suction plates 19 are mounted substantially flush with the table top 209 and in spaced parallel relationship one on each side of the slot 211. A series of apertures 21 (FIGURE 8) in the plates 19 communicate with the vacuum pumps 193, 194 which provide the suction force to firmly hold the film strips in place on the table top. A left vacuum switch 216 is provided to control the left vacuum pump 193 which is connected to plate 19 on the left side of the groove 111 and a right vacuum switch 217 is provided to control the right vacuum pump 194, the latter being connected to the plate 19 on the right side of said groove.

Referring to FIGURES 7 and 8, suction plates 19, which are hollow, are secured to the web 73 of the support member 58 by an arrangement including brackets 162, 164 and 168 and pad 163. A pair of guide stops 187 are mounted on the pad 163 by screws 165 to maintain the alignment of the film edge 12 adjacent the plates 19. The vacuum sources 193, 194 are coupled to the plates 19 by suitable fittings, such as 161, connected by tubing to the sources. The suction plates are divided into individual sections corresponding to the various widths of film to be accommodated, e.g. 70 mm., 5 inches, 9 inches, and individual connections are made from the vacuum sources to each of the sections. Solenoid valves 251 to 254 (FIGURE 13) control the sections of the plates 19 to be actuated in accordance with the position of the width selector switch 215. The innermost portion of the plates, corresponding to a 70 mm. width, always remains activated once the switches 216, 217 are thrown and do not require valves. If a 5 inch film is to be used, the switch 215 actuates solenoids 251 and 252 only, and if a 9 inch width is selected, all four solenoids are energized. This selective arrangement avoids activation of unused portions of the plates 19 which would be disturbing to the operator and an unnecessary burden on the vacuum pumps.

By convention, the advance of the film strip during the editing process proceeds from left to right. The operator cranks the right hand reel 220 until an unwanted segment of film has passed over the left-hand viewing area 210 and the following wanted segment has its edge aligned with the cutting knife 180. The operator then throws the left vacuum switch 216 which actuates vacuum pump 193 to apply suction to the left-hand plate 19, thereby to retain the film in fixed position. The film is then slit by manually pushing the cutter 180 across the entire width of the film, after which it is returned to its home position adjacent the front edge of the table. The cutter 180 may conveniently be provided with rotary cutter blades (not shown) so located that the actual cutting plane is below the plane of the film. The cutter housing includes a guide arrangement which pulls the free end of the film down to the plane of the cutter blades. This downward pull is designed to place the cut a distance from the intended line equal to the amount of overlap required for the splice, e.g. .020 to .125 inch. This automatic feature relieves the operator of the burden of measuring or gauging the overlap.

After being cut, the left-hand film segment is maintained firmly in position by the left-hand suction plate 19 and the right-hand film segment is manually unwound from its reel over the already cut left-hand segment until the right-hand edge of the unwanted film segment is aligned with the cutter 180 and firmly positioned against the guide rail 224 and the guide block 187. Once the right-hand segment 15 is properly positioned, the right vacuum switch 217 is actuated to activate its associated suction plate 19 and hold it firmly to the table top. The operator now has both hands free to continue the operation of the equipment. Another pass across the film is made with the cutter to trim the segment 15 to its proper length, which will include the pre-set overlap described above. The result is a film overlap over the slot 211 which is visible to the operator.

When the cutter 180 is returned to its home position at the front of the cabinet 200, bushing 184 contacts the lever 191 to actuate microswitch 188 thus enabling the remainder of the circuit. The switch 188 prevents actuation of the lifting mechanism for the vibrator assembly 20 while the cutter is over the active portion of the slot 211, thereby preventing accidental damage to the equipment.

The editing portion of the operation now completed, the START push-button switch 235 is pressed and held to actuate solenoid valve 239 in the conduit 64 from the air compressor 238. This supplies air to the cylinder 63 and raises the entire vibrator assembly 20. The switch 235 is held until the vibrator assembly reaches its proper height with the work surface 23 of the member 22 flush with the table top. At this point, the switch 170 on the base plate 37 of the vibrator assembly is actuated to lock up the solenoid 239 through its contacts. This maintains the vibrator assembly in its elevated position and the START switch may now be released.

After inspection of the overlap area to insure that the film segments are properly positioned, the START switch is again pressed to start the sealing cycle and held down for a second or two to energize the time-delay relay 240 and close its contacts. Power is thus applied to the sequence relay 241 to move its armatures to their lower contacts. The upper connection serves to lock up the relay in its energized condition.

The contacts of relay 241 also energize the ultrasonic power generator 190 to supply energy to the vibrator assembly 20 and set the work surface 23 into vibration. At the same time, the middle armature of the relay connects power to the drive motor 78 (through the contacts of relay 242) to start the movement of the carriage assembly 75 from its retracted position.

As the carriage assembly moves forward, the switch 97 is actuated periodically by the cam 96 on the shaft 89 (FIGURE 7), such as once for each 1.2 inches of carriage travel (corresponding to twice per revolution of shaft 89). Actuation of switch 97 (to its lower contact) energizes solenoid valve 244 which controls the flow of air from the compressor 238 via conduit 155 to the bellows 135 on the carriage assembly. Extraction of the bellows pivots the arm 100 about the shaft 114 and brings the anvil shoe 103 into contact with the upper side of the overlap area of the film to urge it against the vibrating work surface and effect a seal. The cam 96 is designated to actuate the switch 97 for a short interval and then release it, so that the anvil shoe produces a tack or seal of about one-quarter inch before it is released.

During the forward motion of the carriage assembly, the cam 140 on the cam plate 139 successively closes limit switches 174, 176, 178. The lowest bank of contacts on the width selector switch 215 connects one of the three limit switches into circuit, corresponding to the width selected, in this case 9 inches. Accordingly, when the cam 140 closes switch 178, relay 242 is energized to move its associated armatures to their lower contacts. It will also be seen that the upper four banks of contacts of switch 215 have actuated the appropriate sections of the suction plates, as explained above.

Operation of relay 242 causes its contacts to lock the relay in its energized state and also reverses the power connection to the drive motor 78, causing it to reverse direction and move the carriage assembly back towards its retracted position. At the same time, both terminals of the switch 97 are connected in circuit so that the solenoid 244 remains energized as the switch 97 is actuated. With the solenoid 244 continuously operated, the bellows 135 remains expanded and the anvil shoe thus remains continuously in contact with the film surface during the return stroke. A continuous seal is thus achieved along the entire length of the overlap area.

When the anvil shoe reaches the end of the film on its return stroke, the switch 245 is actuated (by the roller 195, FIGURE 10) to de-energize relays 241 and 242. This stops all movement of the carriage assembly, opens the solenoid valve 244 to raise the anvil shoe, and shuts off the ultrasonic power generator 190. The left vacuum switch is then turned to its OFF position which opens solenoid valve 239 and allows the vibrator assembly to return to its lower position.

Lowering of the vibrator assembly releases switch 170 to its initial condition and thereby energizes the motor 78 to drive the carriage assembly a short distance further in the the instrument panel. Switch 172 is then closed by the cam 140 terminating the cycle.

The operator then shuts off the right vacuum switch 217 and the spliced film can be moved freely across the table top and wound on the spool.

If at any time during a splicing cycle, the operator observes a malfunciton in the apparatus or misalignment of the film, or for any reason wants to stop the operation, the STOP switch 236 is pressed momentarily, de-energizing all of the relays. The vibratory assembly is thus lowered and upon release of switch 170, the carriage assembly is returned to its retracted position and the motor 78 then de-energized.

Summary

From the foregoing it will be seen that the present invention provides an improved method and apparatus for joining or sealing sheet materials, at least one of which is thermoplastic. The technique of tacking the materials at spaced intervals before the continuous seal is formed permits precision seals to be made with a minimum of overlap, thus avoiding many of the difficulties of prior art film splicing methods.

The present invention is also capable of use with a wider variety of materials than other techniques employing cements and tapes and also avoids the burdensome preparation such as scraping off the emulsion, etc., which they require. The method of the invention has been applied successfully to the splicing of films of the polyester type, e.g. Mylar, Cronar, Estar; the acetate type, e.g. acetate butyrate, tri-acetate; and the polycarbonate type, e.g. Plestar.

The apparatus dislcosed is effective to carry out the process most effectively. The sealing operation itself is performed automatically and quickly and the apparatus is capable of repeated operation for long periods of time. The novel arrangement of the extended vibratory surface and the moving anvil providing a small area contact enables a substantial reduction in the driving power required for the ultrasonic elements since at any given time the power is concentrated effectively along a single line. Moreover, the cylindrical contact surface assures automatic termination of the sealing action at the proper time. The vibration of the work surface also lowers the friction force between the anvil and the film, reducing the tendency to pucker or creep and keeping wear on both film and anvil to a minimum. These factors are particularly important in processing very thin films and the present apparatus is extremely effective with such materials.

The particular configuration of the illustrated apparatus is of course, susceptible of many variations within the skill of the art. Various modifications in the mounting arrangement, the drive system and the electrical circuitry are possible within the present teachings and it is intended that the invention be limited only as set forth in the appended claims.

We claim:

1. A method of joining sheet materials, at least one of which is thermoplastic, comprising the steps of overlapping the segments of the material to be joined, applying high frequency vibratory forces and static forces to respective opposite sides of said overlapped segments at spaced locations in the area of overlap to join said segments thereat, and subsequently applying said high frequently vibratory forces and static forces to respective opposite sides of said overlapped segments and moving the point of application thereof along a line traversing the area of overlap while said forces are continuously applied to said materials, thereby to effect joinder of said materials along said continuous line.

2. A method of joining sheet materials, at least one of which is thermoplastic, comprising the steps of positioning the segments of material to be joined one over the other to form an area of overlapping contact, applying high frequency vibratory forces to one side of said area of overlap, applying static forces to the other side of said area of overlap at spaced locations opposite said vibratory forces in a direction to subject said overlapping materials to compression whereby they are joined at said locations, and subsequently applying to said other side of said area of overlap a static force along a continuous path traversing said area of overlap to effect a joining of said segments along the area of overlap.

3. A method of joining sheet materials, at least one of which is thermoplastic, comprising the steps of positioning the segments of material to be joined one over the other to form an area of overlapping contact, applying high frequency vibratory forces to one side of said area of overlap along a line traversing said area, applying static forces to the other side of said area of overlap at spaced locations of limited area opposite said vibratory forces in a direction to subject said overlapping materials to compression and join said segments at said locatons, and subsequently applying to said other side of said area of overlap a static force along a continuous path traversing said area of overlap to effect a continuous joining of said segments along the area of overlap.

4. A method of joining sheet materials, at least one of which is thermoplastic, employing a high frequency vibratory surface having a substantial component of vibratory motion normal to said surface, comprising the steps of positioning the segments of material to be joined on said vibratory surface one over the other to form an area of overlapping contact having one side on said surface, while said surface is vibrating applying a static force to the other side of said area of overlap successively at spaced locations therealong in a direction to urge said materials against the vibrating surface and join them at said locations, and subsequently applying a static force in said direction along a continuous path traversing said area of overlap to effect a joining of said segments along the area of overlap.

5. A method of joining sheet materials, at least one of which is thermoplastic, employing a high frequency vibratory surface of extended length having a substantial component of vibratory motion normal to said surface, comprising the steps of positioning the segments of material to be joined on said vibratory surface one over the other to form an area of overlapping contact having one side on said surface, while said surface is vibrating applying a static force to the other side of said area of overlap successively at spaced locations of limited area in a direction to urge said materials against the vibrating surface and join them at said locations, and subsequently applying a static force in said direction along a continuous path traversing said area of overlap to effect a joining of said segments continuously along the area of overlap.

6. The method of claim 5 above, wherein said continuous path includes said spaced locations.

7. A method of joining sheet materials, at least one of which is thermoplastic, employing a high frequency vibratory surface of extended length, comprising the steps of positioning the segments of material to be joined on said vibratory surface one over the other to form an area of overlapping contact having one side on said surface, inducing vibration of said entire surface having a substantial component of motion normal to said surface, applying static forces to the other side of said area of overlap at spaced locations of limited area opposite said vibrating surface in a direction to urge said segments against said surface and join them at said locations, and subsequently applying to said other side of said area of overlap a static force along a continuous path traversing said area of overlap to effect a continuous joining of said segments along the area of overlap.

8. A method of joining sheet materials, at least one of which is thermoplastic, employing a high frequency vibratory surface of extended length, comprising the steps of positioning the segments of material to be joined on said vibratory surface one over the other to form an area of overlapping contact having one side on said surface, inducing vibration of said surface at a frequency of between about 5,000 to 100,000 cycles per second, said vibration having a component of motion normal to said surface of from about .0005 to .003 inch, applying static forces to the other side of said area of overlap at spaced locations of limited area opposite said vibrating surface in a direction to urge said segments against said surface and join them at said locations, and subsequently applying to said other side of said area of overlap a static force along a continuous path traversing said area of overlap to effect a continuous joining of said segments along the area of overlap.

9. A method of joining sheet materials, at least one of which is thermoplastic, in which the segments of material to be joined are overlapped and the overlapped area subjected to the combined action of a high frequency vibratory surface of extended length and a limited area nonvibratory anvil, comprising the steps of positioning one side of said overlapped area of said segments on said vibratory surface such that said surface extends across said area, while said surface is vibrating urging said anvil against the other side of said overlapped area in a direction to compress the segments between said anvil and said surface at a plurality of spaced locations of limited area opposite said vibratory surface to join said segments at said spaced locations, and subsequently moving said anvil along a path traversing said overlapped area opposite said vibrating surface with said anvil continuously in contact with said other side and urged toward said vibrating surface, thereby to effect a continuous joinder of said segments along said path.

10. A method of joining sheet materials, at least one of which is thermoplastic, in which the segments of material to be joined are overlapped and the overlapped area subjected to the combined action of a high frequency vibratory surface of extended length and a limited area non-vibratory anvil, comprising the steps of positioning one side of said overlapped area of said segments on said vibratory surface such that said surface extends across said area, inducing high frequency vibrations in said surface having a substantial component of motion normal to said surface, moving said anvil in one direction above and across said overlapped area opposite said surface and while so moving, periodically urging said anvil against the other side of said overlapped area in a direction to compress the segments between said anvil and said surface for a period of time and with a force sufficient to effect joinder of said materials at a plurality of limited area spaced locations, and subsequently moving said anvil across said overlapped area in the opposite direction with the anvil continuously applying said force to the segments, whereby a continuous joinder of said segments across said area of overlap is obtained.

11. Apparatus for joining sheets of material comprising means for maintaining portions of said sheets in overlapping relationship to each other, means for applying high frequency vibrations to one side of said sheet materials along their area of overlap, means for applying compressive forces at spaced intervals against the other side of the sheets along their area of overlap to join said sheets at a plurality of locations therein, and means for continuously applying a compressive force against said other side of the sheets along a line traversing said area of overlap, to obtain a complete joining of the sheets along said overlapping area.

12. Apparatus for joining sheets of material comprising, means for maintaining a portion of said sheets in overlapping relationship to each other, means for applying high frequency vibrations to one side of said sheet materials along their area of overlap, said vibrations having a substantial component of motion perpendicular to the surfaces of the sheets in their area of overlap, means for intermittently applying a compressive force against the other side of the sheets along their area of overlap to join said sheets at a plurality of spaced locations therein, said force having a substantial component of motion perpendicular to the surfaces of the sheets in their area of overlap, and means for continuously applying a compressive force against said other side of said sheets and moving said force along a continuous line traversing the area of overlap while being applied to said sheets, to completely join the sheets along said area.

13. Apparatus for joining sheets of material comprising, means for maintaining the end portions of said sheets in fixed, overlapping relationship to each other, means for applying high frequency vibrations along one side of the overlapped area of said sheets, said vibrations having a substantial component of motion perpendicular to the surfaces of the sheets in the area of overlap, a contact member for applying a static force to the other side of said overlap area in a direction to urge said sheets against said high frequency vibratory means, and control means for moving said contact member across said overlap area in two directions and actuating said contact member to apply said static force to said sheets intermittently while moving in one direction and continuously while moving in the other direction.

14. Apparatus for joining sheets of material comprising, means for maintaining a portion of said sheets in overlapping relationship to each other, a vibratory member having an extended working face for contact with said sheets, means to position said working face in contact with the overlapped portions at one side of the latter, means coupled to said vibratory member to impart high frequency vibrations to said entire working face, said vibrations having a substantial component of motion perpendicular to said overlapping surfaces, means for applying static forces at spaced locations on the other side of the overlapped portions along a path traversing the area of overlap, said static forces exerting sufficient pressures against the sheets in a direction towards the working face of the vibratory member to obtain a series of spaced tack joinings of the materials along their overlapping surfaces, and means for subsequently applying a static force on said other side of the sheets substantially continuously along a line traversing their area of overlap to obtain a continuous joining of the materials along their entire area of overlap.

15. Apparatus for joining materials in sheet form comprising a surface for supporting the materials to be joined with portions of their surfaces in fixed, overlapping relationship to each other, a vibratory member having an extended working face for contact with said materials, means normally maintaining said member with said working surface out of contact with area of overlap of said materials, means to move said working face into contact with the overlapped materials at one side of the latter, means coupled to said vibratory member to impart high frequency vibrations to said entire working face, said vibrations having a substantial component of motion perpendicular to said overlapping surfaces, means for applying static forces at spaced locations on the other side of and along a path traversing the area of overlap, said static forces exerting sufficient pressures against the overlapped surfaces in a direction towards the working face of the vibratory member to obtain a series of spaced tack joinings of the materials along their overlapping surfaces, and means for subsequently applying a static force on said other side of the materials substantially continuously along a line traversing their area of overlap to obtain a continuous joining of the materials along their entire area of overlap.

16. Apparatus for joining sheets of material, at least one of which is thermoplastic, comprising, means for maintaining portions of said sheets in overlapping relationship to each other, a vibratory member having an extended working face for contact with said sheets, means to position said working face in contact with the overlapped sheets along one side of their area of overlap, means coupled to said vibratory member to impart high frequency vibrations to said entire working face, said vibrations having a substantial component of motion perpendicular to said overlapping surfaces, a contact member having a contacting face for engaging the other side of said area of overlap, a guide element carried by said contact member for preventing separation of said overlapped portions prior to being engaged by the contacting face of said contact member, means for simultaneously moving said contact member along a path transverse to said area of overlap and intermittently into engagement with said sheets with sufficient pressure to obtain a joining of the materials upon each contact of said face with the sheets, and means for subsequently moving said shoe along said path with the contacting face of said contact member in continuous contact with said sheets and under sufficient pressure to obtain a continuous joining of the materials along their area of overlap.

17. Apparatus for joining strips of material, at least one of which is thermoplastic, comprising a supporting surface on which the strips of material to be joined are supported in fixed overlapping relationship to each other, the area of overlap being of a predetermined width, a vibratory member having an elongated working face of a width greater than the width of said overlap, means to position and maintain said working face in contact with one side of said area of overlap over its entire length, means coupled to said vibratory member to impart high frequency vibrations to said entire working face, said vibrations having a substantial component of motion perpendicular to said overlapping surfaces, a movable carriage having a contact member extending therefrom, said contact member having a contacting face for engaging the strips of material along their area of overlap on the side thereof remote from the working face of the vibratory member, means for reciprocating said carriage to move said contact member forward and backward across the overlapped strips along a path extending longitudinally of said area of overlap, means operative simultaneously therewith to urge said contact member into intermittent engagement with the strips along their area of overlap on the forward movement of the carriage and into continuous engagement with said strips on its backward movement, said engagement being under sufficient pressure to effect a joinder of the materials, whereby said strips are tacked together at spaced points of the forward movement of the carriage and continuously joined on the backward movement.

18. Apparatus according to claim 17 wherein the contacting surface of said contact member is a portion of cylinder whose axis is perpendicular to the path of motion of said contact member and parallel to said overlapping surfaces.

19. Apparatus according to claim 17 wherein the contacting surface of said contact member is a portion of a cylinder whose axis is perpendicular to the path of motion of said contact member and parallel to said overlapping surfaces, and wherein said working face of said vibratory member and said contacting surface are of widths sufficiently greater than the width of said area of overlap that the force supplied by said contact member is distributed over sufficient area of the strips on both sides of the overlap area after joinder is effected to reduce the pressure in the overlap area below the value required to sustain the joining action.

20. In apparatus for joining sheet materials in which an area of overlap of said materials is subjected to compressive forces between an elongated, stationary vibratory member and a movable contact member, means for supporting said contact member comprising a movable carriage, an elongated arm having means at one end thereof for rigidly holding said contact member, means intermediate the ends of said arm for pivotally mounting said arm on said carriage, means for moving said carriage to cause said contact member to follow a path extending along said area of overlap, and means operable while said carriage is moving to rotate said arm about its pivotal mounting to urge said contact member against said sheet materials.

21. In apparatus for joining sheet materials in which an area of overlap of said materials is subjected to compressive forces between an elongated, stationary vibratory member and a movable contact member, means for supporting said contact member comprising a movable carriage, an elongated arm having means at one end thereof for rigidly holding said contact member, means intermediate the ends of said arm for pivotally mounting said arm on said carriage, means for moving said carriage to cause said contact member to follow a path extending along said area of overlap, extendable and retractable means mounted on said carriage for rotating said arm about its pivotal mounting to urge said contact member against said sheet materials, and control means operable while said carriage is moving to actuate said extendable and retractable means.

22. Apparatus according to claim 21 above wherein said extendable and contractable means comprises a bellows and said control means includes a source of compressed gas.

23. In apparatus for joining sheet materials in which an area of overlap of said materials is subjected to compressive forces between an elonated, stationary vibratory member and a movable contact member, means for supporting said contact member comprising a movable carriage, an elongated arm having means at one end thereof for rigidly holding said contact member, means intermediate the ends of said arm for pivotally mounting said arm on said carriage with the other end of said arm adjacent the carriage, means for moving said carriage to cause said contact member to follow a path extending along said area of overlap, means mounted on said carriage between said carriage and said other end of said arm for rotating said arm about its pivotal mounting to urge said contact member against said sheet materials, and control means operable upon movement of said carriage to actuate said means for rotating said arm, whereby said contact member is urged against said sheets while moving across the area of overlap.

24. Apparatus according to claim 23 wherein said carriage is moved by motive means including a shaft and said control means includes cam means on said shaft for periodically actuating said means for rotating.

25. Appaartus according to claim 24 wherein said motive means is bidirectional to move said carriage in either of two directions and said cam means is operable to periodically actuate said means for rotating only during movement of said carriage in one of said two directions.

26. Apparatus according to claim 25 wherein said control means further includes means to maintain said means for rotating said arm actuated continuously during movement of said carriage in the other of said two directions.

27. In apparatus for joining sheet materials, at least one of which is thermoplastic, in which the materials are overlapped prior to joinder, the combination of an elongated vibratory member extending along the length of said area of overlap and having a working face substantially wider than said area of overlap, means for vibrating said member at a high frequency with the working face thereof in contact with one side of said area of overlap, and a movable contact member urging said sheet materials against said working face, said contact member having a contacting surface in the form of at least a portion of a cylinder whose axis is perpendicular to the length of said area of overlap and parallel to the surfaces of the materials in said area of overlap.

28. The combination in accordance with claim 27 wherein said cylindrical contacting surface is substantially wider than said area of overlap.

29. The combination in accordance with claim 27 wherein said working face and said contacting surface are sufficiently wide relative to the width of said area of overlap that the force supplied by said contact member is distributed over sufficient areas of the sheet materials on both sides of the overlap area after joinder is effected to reduce the pressure in the overlap area below the value required to sustain the joining action.

No references cited.

DOUGLAS J. DRUMMOND, *Primary Examiner.*

U.S. Cl. X.R.

29—470; 228—1

UNITED STATES PATENT OFFICE
CERTIFICATE OF CORRECTION

Patent No. 3,418,185                         December 24, 1968

Lewis Balamuth et al.

It is certified that error appears in the above identified patent and that said Letters Patent are hereby corrected as shown below:

Column 1, line 52, "versitile" should read -- versatile --. Column 2, line 22, "applicatio nof" should read -- application of --. Column 5, line 27, "is" should read -- in --; line 49, "srtip" should read -- strip --; line 63, "uges" should read -- urges --. Column 6, line 29, "rang" should read -- range --. Column 7, line 15, "conisiderably" should read -- considerably --; line 65, "eleemnts" should read -- elements --; line 71, after "both" insert -- the tacking and continuous fusing operations and by --. Column 8, line 17, "ar ectangular" should read -- a rectangular --. Column 9, line 45, "magentic" should read -- magnetic --. Column 10, line 55, "base" should read -- bars --. Column 11, line 32, "horizantal" should read -- horizontal --. Column 12, line 16, "overlapping" should read -- overlapped --. Column 16, line 6, "Extraction" should read -- Extension --; line 57, "malfuncition" should read -- malfunction --. Column 17, line 9, "dislcosed" should read -- disclosed --; line 69, "locatons" should read -- locations --. Column 22, line 9, "elonated" should read -- elongated --; line 30, "Appaartus" should read -- Apparatus --.

Signed and sealed this 24th day of March 1970.

(SEAL)
Attest:

EDWARD M. FLETCHER, JR.                  WILLIAM E. SCHUYLER, JR.
Attesting Officer                          Commissioner of Patents